(12) United States Patent
Takizawa et al.

(10) Patent No.: US 9,368,143 B2
(45) Date of Patent: Jun. 14, 2016

(54) METHOD FOR FORMING PATTERN, METHOD FOR PRODUCING MAGNETIC RECORDING MEDIUM USING THE SAME, MAGNETIC RECORDING MEDIUM, AND METHOD FOR PRODUCING STAMPER

(71) Applicant: KABUSHIKI KAISHA TOSHIBA, Tokyo (JP)

(72) Inventors: Kazutaka Takizawa, Kawasaki (JP); Akira Watanabe, Kawasaki (JP); Kaori Kimura, Yokohama (JP); Takeshi Iwasaki, Inagi (JP); Akihiko Takeo, Kokubunji (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 184 days.

(21) Appl. No.: 14/060,247

(22) Filed: Oct. 22, 2013

(65) Prior Publication Data

US 2015/0004438 A1   Jan. 1, 2015

(30) Foreign Application Priority Data

Jun. 28, 2013   (JP) .................................. 2013-137302

(51) Int. Cl.
*G11B 5/74* (2006.01)
*G11B 5/855* (2006.01)
*G11B 5/86* (2006.01)

(52) U.S. Cl.
CPC ................ *G11B 5/746* (2013.01); *G11B 5/855* (2013.01); *G11B 5/865* (2013.01)

(58) Field of Classification Search
None
See application file for complete search history.

(56) References Cited

U.S. PATENT DOCUMENTS

| 7,667,310 | B2 | 2/2010 | Dozen et al. |
| 8,114,331 | B2 | 2/2012 | Houle et al. |
| 2012/0206834 | A1 | 8/2012 | Ueda et al. |
| 2013/0065083 | A1 | 3/2013 | Takizawa et al. |

FOREIGN PATENT DOCUMENTS

| JP | 2009-295212 | 12/2009 |
| JP | 2010-009710 | 1/2010 |
| JP | 2010-108559 | 5/2010 |
| JP | 2011-090724 | 5/2011 |
| JP | 2013-058294 | 3/2013 |

*Primary Examiner* — Mandy Louie
(74) *Attorney, Agent, or Firm* — Knobbe, Martens, Olson & Bear LLP

(57) ABSTRACT

According to one embodiment, there is provided a method for forming a pattern including forming an island-like metal underlayer comprised of a first metal, a phase-separated release layer including a first metal, a second metal, and a metal oxide, a mask layer, and a resist layer on a processed layer in this order, forming a concave-convex pattern on the resist layer, transferring the pattern to the mask layer, the phase-separated release layer, and the processed layer in this order, dissolving the phase-separated release layer using a peeling liquid for dissolving the first metal and the second metal, and removing the mask layer from the processed layer to expose the concave-convex pattern.

15 Claims, 13 Drawing Sheets

F I G. 3A
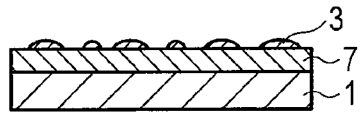
F I G. 3B
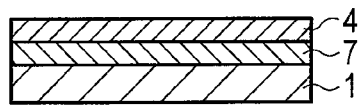
F I G. 3C
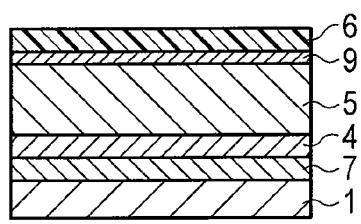
F I G. 3D
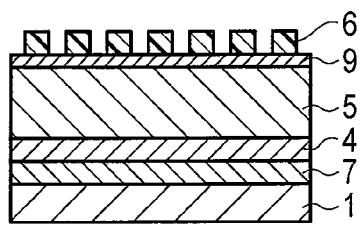
F I G. 3E
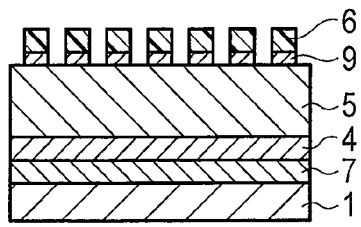
F I G. 3F
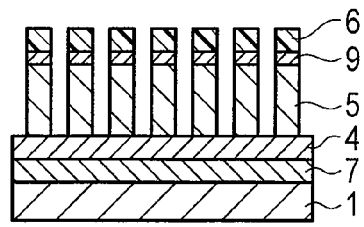
F I G. 3G
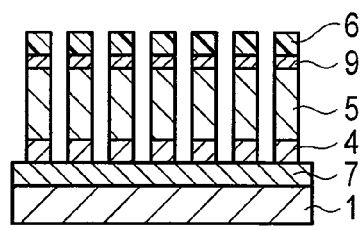
F I G. 3H
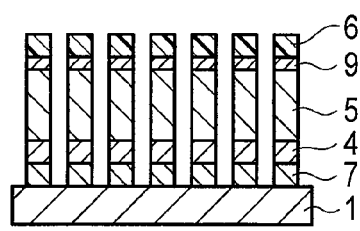
F I G. 3I
F I G. 3J
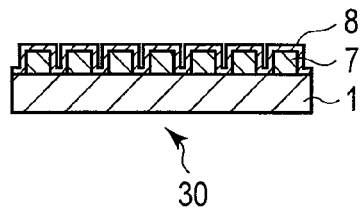
F I G. 3K

F I G. 6A
F I G. 6B
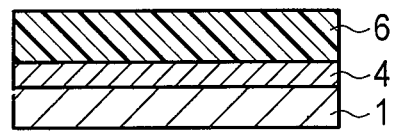
F I G.6C
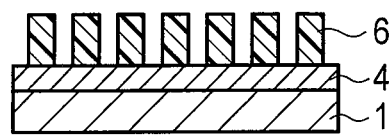
F I G. 6D
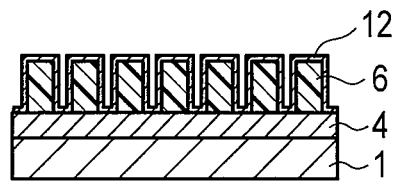
F I G. 6E
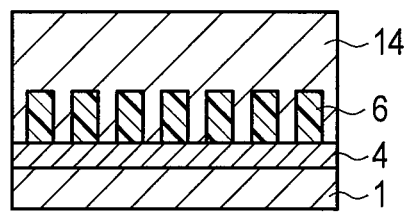
F I G. 6F
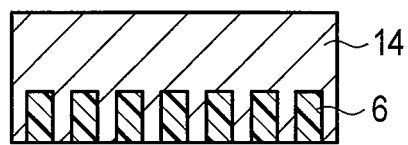
F I G. 6G
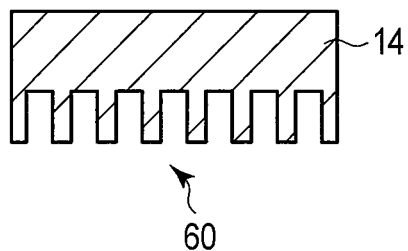
F I G. 6H

F I G. 7A
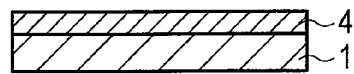
F I G. 7B
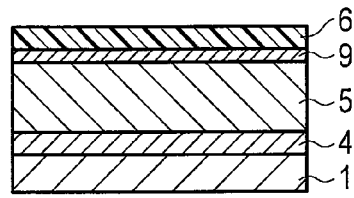
F I G. 7C
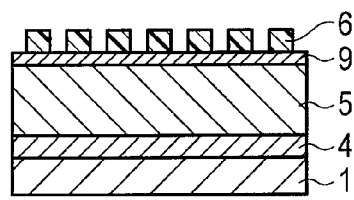
F I G. 7D
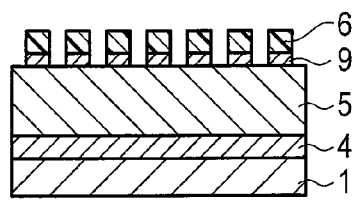
F I G. 7E
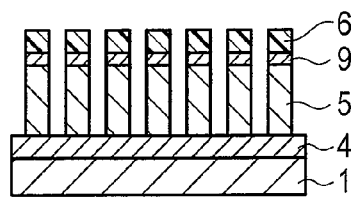
F I G. 7F
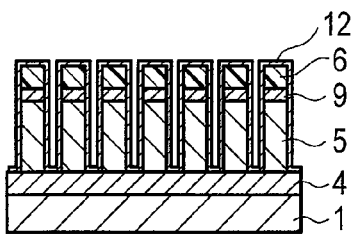
F I G. 7G
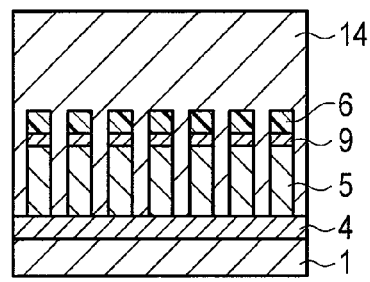
F I G. 7H
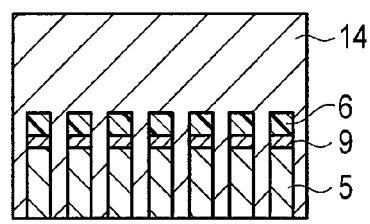
F I G. 7I
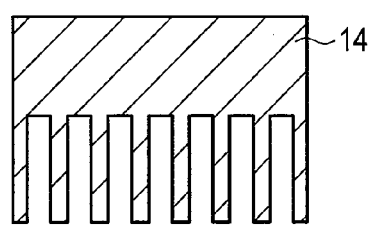
F I G. 7J

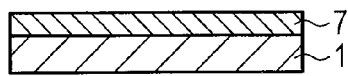
F I G. 10A
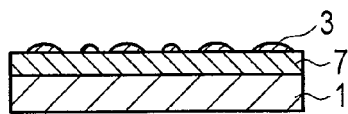
F I G. 10B
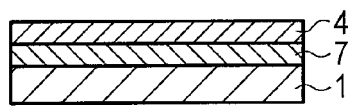
F I G. 10C
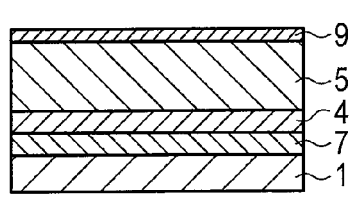
F I G. 10D
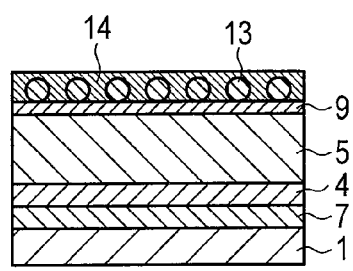
F I G. 10E
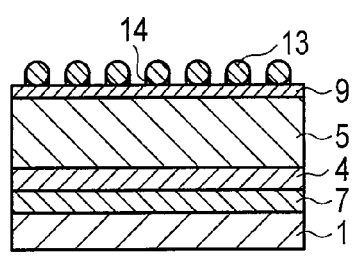
F I G. 10F
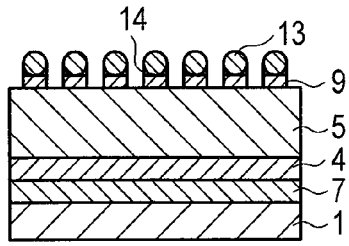
F I G. 10G
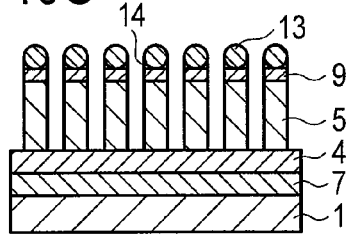
F I G. 10H
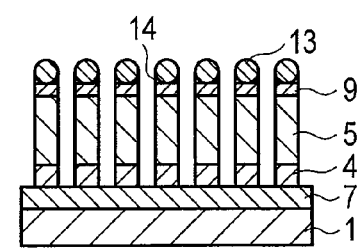
F I G. 10I
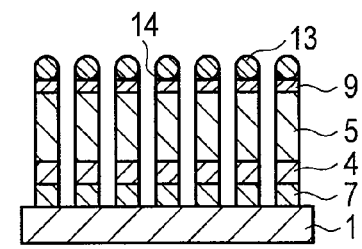
F I G. 10J
F I G. 10K
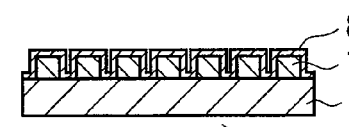
F I G. 10L

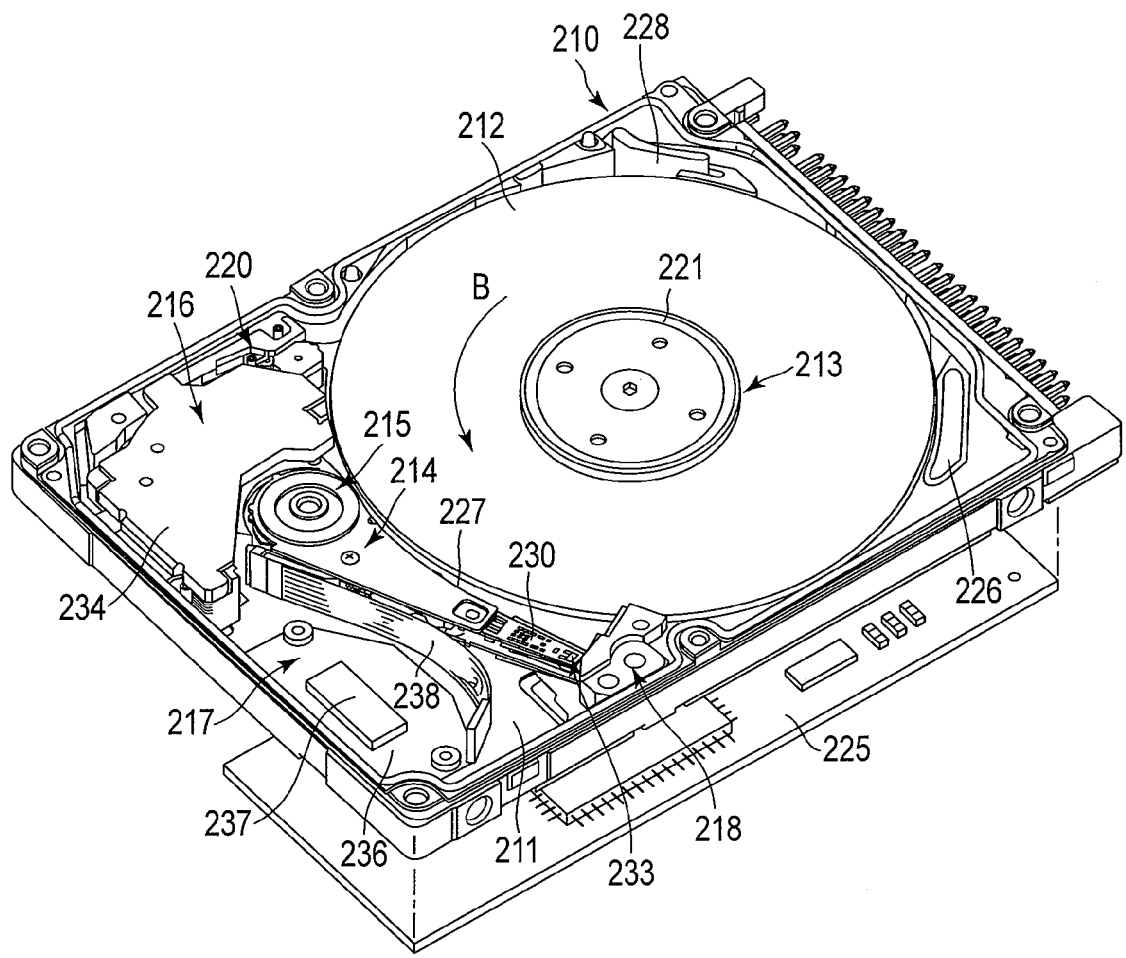
F I G. 17

METHOD FOR FORMING PATTERN, METHOD FOR PRODUCING MAGNETIC RECORDING MEDIUM USING THE SAME, MAGNETIC RECORDING MEDIUM, AND METHOD FOR PRODUCING STAMPER

CROSS-REFERENCE TO RELATED APPLICATIONS

This application is based upon and claims the benefit of priority from Japanese Patent Application No. 2013-137302, filed Jun. 28, 2013, the entire contents of which are incorporated herein by reference.

FIELD

Embodiments described herein relate generally to a method for forming a pattern, a method for producing a magnetic recording medium using the same, a magnetic recording medium, and a method for producing a stamper.

BACKGROUND

With a significant increase in the amount of information, there is an eager demand for the realization of a large volume information recording apparatus. In the hard disk drive (HDD) technology, a high recording density is achieved. Thus, various techniques concentrating on perpendicular magnetic recording have been developed. Further, a patterned medium is suggested as a medium which satisfies both the improvement in recording density and the thermal decay resistance. The technique for manufacturing the medium has been actively developed.

The patterned medium records one or more magnetic areas as one cell. In order to record 1-bit information in one cell, it is possible that recording cells are magnetically separated. Therefore, it is only necessary to form a magnetic dot portion and a nonmagnetic portion on the same flat surface using a fine processing technology. There is a method including: forming a fine concave-convex pattern on a magnetic recording layer formed on a substrate using a semiconductor manufacturing technology; and physically dividing the pattern to obtain magnetically independent patterns.

In order to form a magnetic dot pattern, it is only necessary to previously form a mask on a magnetic film and transfer the concave-convex pattern. Alternatively, there are a method including: forming the concave-convex pattern on a mask material; and injecting ions irradiated with high energy into the magnetic area in order to selectively deactivate the pattern and a method including: pressing a concave-convex mold against a resist material in order to transfer the concave-convex pattern.

On the other hand, progress in the refinement of a wiring pattern which is used for a semiconductor device is also remarkable. For example, in the gate wiring of an MOS transistor, the pattern is narrowed to the order of several tens (nm). The number of the semiconductor device which can be mounted on each unit is tied to the recording capacity. Therefore, it is necessary to further produce a fine pattern on a substrate.

In order to form these fine patterns on the substrate, it suffices that a concave-convex portion is formed on the above mask material, and the concave-convex pattern is transferred to the lower layer side. In order to remove the mask pattern remained on the concave-convex pattern after transfer, the mask itself is removed by a method such as etching. Alternatively, a method including forming a release layer between a processed layer and a mask layer in advance, removing the release layer after the concave-convex processing of the processed layer to remove the unnecessary mask layer from a substrate (the so-called lift-off) is used.

In the case of scanning a medium with a magnetic head configured to perform reading/writing of a magnetic recording medium, the height of the convex portion which is a magnetic dot is increased, giving rise to head crash if the mask pattern on the magnetic recording layer remains. Further, if the distance between the magnetic recording layer and the magnetic head is large, the signal S/N ratio detectable by the magnetic head is small. This is why it is necessary to eliminate the mask pattern on the magnetic recording layer to decrease the height of the convex portion after the patterning of magnetic recording layer. In an actual process, a release layer can be formed between the magnetic recording layer and the mask layer. The mask layer is removed from the top of the magnetic recording layer by dissolving the release layer. Thus, the surface smoothness of the medium can be improved and excellent glide characteristics can be obtained.

Examples of the process of releasing the patterned medium includes a method including exposing a carbon film to an oxygen plasma atmosphere and releasing by dry etching and a method comprising using a metal film as a release layer and releasing by wet etching using a peeling solution such as an acid. In dry etching, particles which remain after processing of the mask become a transfer mask. Thus, the particles also remain on the surface of the medium after processing, and Head Disk Interface (HDI) characteristics are deteriorated. On the other hand, in wet etching, the particles are lifted off by dissolving the release layer. Therefore, the amount of the substance remained on the surface of the medium is decreased and the HDI characteristics are improved.

The release layer to be used in wet releasing becomes an underlayer of the mask layer to be formed at the upper portion, and thus the surface roughness of the release layer can be small in order to reduce variation in pattern size after processing of the mask and maintain the in-plane uniformity.

On the other hand, it is necessary to transfer the concave-convex pattern to the release layer before processing the magnetic recording layer. At that time, regression of the mask layer occurs, which causes a problem such that the process margin of the magnetic recording layer becomes narrow. Then, in order to achieve the process margin and the peel properties, the thickness of the release layer is generally adjusted to an optimal thickness in the conventional technique. However, if the release layer is formed into a thin film, regression of the processed mask is small. However, the contact area of the peeling solution with the release layer is decreased, resulting in an increase in the amount of residues after peeling. On the other hand, when the release layer is formed into a thick film, the peel properties are improved. However, the margin for processing the thick release layer becomes narrow and variation in pattern size increases with an increase of the surface roughness. Therefore, the adjustment of the thickness of release layer does not reach a solution of the essential problem. In the transfer and peeling off of the fine pattern in the release layer, it is possible to improve the processability, peel properties, and surface smoothness of the release layer.

In the semiconductor device, wiring pattern lift-off defects lead to defects (short circuit of signals). Thus, the unnecessary layer which remains between the concave-convex portions must be removed as much as possible. Accordingly, in the case of the concave-convex pattern having a fine size, it is essential to use a release layer which can be reliably removed.

Hence, the releasing rate (etching rate) of the release layer to the peeling solution can be faster.

Further, as described above, remarkably narrowing of the pattern results in deterioration of the processability during etching. This is because active species during etching are not sufficiently in contact with the fine concave-convex portion, which becomes a factor of reducing the process margin. Consequently, there is a demand for the release layer to be formed at the lower portion of the mask layer to have more excellent processability, that is, a high etching rate.

As described above, in lift-off processing of the fine pattern, requirements for the release layer include the followings: (1) high releasing rate, (2) high dry etching rate, and (3) surface smoothness. A material which can improve the above elements is required.

For example, a technique of using an alloy or oxide as the release layer is suggested. However, it is necessary to peeling using an acid peeling liquid with a high concentration. The contact with the peeling liquid causes damage on the surrounding materials.

Further, for example, a technique of using a metal release layer whose surface is modified is suggested. However, it is difficult to maintain the surface flatness. The surface flatness is further deteriorated due to subsequent stacking of the mask layer, resulting in impairment of the pattern uniformity.

Therefore, when a narrowed pattern is formed using the conventional technique, the peel properties, the processability, and the surface smoothness are not satisfied, resulting in deterioration of the pattern uniformity. In the semiconductor device, this leads the defect short circuit in signal wiring and the deterioration of Head Disk Interface (HDI) characteristics in the magnetic recording medium.

BRIEF DESCRIPTION OF THE DRAWINGS

FIGS. 3A, 3B, 3C, 3D, 3E, 3F, 3G, 3H, 3I, 3J, and 3K are views showing another example of the method for producing a magnetic recording medium according to the second embodiment;

FIGS. 6A, 6B, 6C, 6D, 6E, 6F, 6G, and 6H are views showing an example of a method for producing a stamper according to a third embodiment;

FIGS. 7A, 7B, 7C, 7D, 7E, 7F, 7G, 7H, 7I, and 7J are views showing another example of the method for producing a stamper according to the third embodiment;

FIGS. 10A, 10B, 10C, 10D, 10E, 10F, 10G, 10H, 10I, 10J, 10K, and 10L are views showing another example of views showing another example of the method for producing a magnetic recording medium according to the second embodiment;

FIG. 17 is a perspective view of a partially disassembled of a magnetic recording/reproducing device to which the magnetic recording medium according to the embodiments can be applied.

DETAILED DESCRIPTION

Figure 1A:
FIGS. 1A, 1B, 1C, 1D, 1E, 1F, 1G, 1H, and 1I are views showing an example of a method for forming a pattern according to a first embodiment.

According to the first embodiment, the method for forming a pattern includes forming a processed layer on a substrate; forming an island-like metal underlayer including a first metal on the processed layer; forming a phase-separated release layer including at least a first metal, a second metal different from the first metal, and a metal oxide on the processed layer and the island-like metal underlayer; forming a mask layer on the phase-separated release layer; forming a resist layer on the mask layer; forming a concave-convex pattern on the resist layer; transferring the concave-convex pattern to the mask layer; transferring the concave-convex pattern to the phase-separated release layer; transferring the concave-convex pattern to the processed layer; and dissolving the phase-separated release layer using a peeling liquid for dissolving the first metal and the second metal and removing the mask layer from the processed layer to expose the concave-convex pattern comprised of the processed layer.

The method for producing a magnetic recording medium according to the second embodiment employs a magnetic recording layer as the processed layer and includes forming a magnetic recording layer on a substrate; forming an island-like metal underlayer including a first metal on the magnetic recording layer; forming a phase-separated release layer including the first metal, a second metal different from the first metal, and a metal oxide on the magnetic recording layer and the island-like metal underlayer; forming a mask layer on the release layer; forming a resist layer on the mask layer; forming a concave-convex pattern on the resist layer; transferring the concave-convex pattern of the resist layer to the mask layer; transferring the concave-convex pattern to the release layer; transferring the concave-convex pattern to the magnetic recording layer; and dissolving the release layer using a peeling liquid and removing the mask layer from the top of the magnetic recording layer.

The magnetic recording medium according to the third embodiment is one obtained using the method for producing a magnetic recording medium according to the second embodiment.

The method for producing a stamper according to the fourth embodiment includes forming an island-like metal underlayer including a first metal on a substrate; forming a phase-separated release layer including at least a first metal, a second metal different from the first metal, and a metal oxide on the substrate and the island-like metal underlayer; forming a resist layer on the phase-separated release layer; forming a concave-convex pattern on the resist layer; forming a conductive layer along the concave-convex pattern on the resist layer and the phase-separated release layer; forming an electroformed layer by electroplating using the conductive layer as an electrode; dissolving the phase-separated release layer using a peeling liquid for dissolving the first metal and the second metal and removing the substrate from the electroformed layer; and removing the resist layer remained on the electroformed layer.

According to the first to third embodiments, a phase-separated release layer excellent in peel properties by the peeling liquid, processability in dry etching, and surface smoothness can be obtained by forming an island-like metal underlayer including a first metal and a phase-separated release layer including a first metal, a second metal, and a metal oxide on a processed layer in this order. Accordingly, it is possible to carry out concave-convex processing with excellent pattern accuracy.

The first metal and the second metal may be selected from for example, the group consisting of Mo, W, Ge, Zn, Li, Mg, Al, Si, Cr, Co, Ni, Fe, Zr, Nb, Ru, Ag, In, Hf, Ta, Au, Tl, Ga, Y, and Bi. These metals may be selected from the materials corresponding to metal elements of the periodic table. Further, elements including Groups 3 to 13 and Periods 4 to 7, so called D-block elements can be used.

The metal oxide may be selected from the group consisting of $SiO_2$, $TiO_2$, $Al_2O_3$, NiO, $GeO_2$, ZnO, $Cr_2O_3$, CoO, $Fe_2O_3$, $ZrO_2$, $NbO_2$, $RuO_2$, AgO, $HfO_2$, and $Ta_2O_5$.

A third metal different from the first and second metals can be used for the metal oxide.

The first metal and the second metal are soluble in a peeling liquid, while the metal oxide may be insoluble in the peeling liquid. The release layer has a phase-separated structure in the film. The phase-separated structure includes two phases: a phase comprised of the first metal and the second metal and a phase comprised of the metal oxide. Each of the phases may have a periodic or non-periodic structure in the film.

As the peeling liquid, for example, an acid or an alkali may be used.

Specific examples of the acid include inorganic acids such as hydrochloric acid, nitric acid, phosphoric acid, hydrofluoric acid, sulfuric acid, and boric acid; and organic acids such as formic acid, oxalic acid, and acetic acid. These can be appropriately combined for use. Examples of the alkali include sodium hydroxide, potassium hydroxide, and tetramethylammonium hydroxide.

The concentration of the peeling liquid in solution can be set to lower than 5 wt %. Further, it is from 0.01 to 1 wt %. If it is less than 1 wt %, there is a tendency to achieve reduction in residues on the substrate after dissolution of the release layer and reduction in the damage on the surrounding pattern due to the peeling liquid. If it exceeds 1 wt %, the damage due to the excessive dissolution of the peeling liquid to the pattern becomes significant, and further the shape of the concave-convex pattern tends to be deteriorated.

The release layer formed on the substrate is a single film and may have a surface roughness of 0.2 nm or less.

If the surface roughness of the release layer exceeds 0.2 nm, the roughness of the mask layer to be formed on the release layer cannot be disregarded. Thus, the variation in size of the transferred concave-convex pattern tends to increase. In fact, the roughness of each of the surface of the substrate and the surface of the processed layer is superimposed on the roughness of the release layer. In an actual process, the surface roughness of the release layer formed on the processed layer on the substrate can be adjusted to 0.38 nm or less.

In this regard, the term "surface roughness" used herein means one obtained by measuring a difference between the concave-convex portions in the surface with an atomic force microscope (AFM) and converting the result into an average in the target surface.

A process of forming the transfer layer on the mask layer may be further included before a process of forming the resist layer.

Hereinafter, embodiments will be described with reference to the drawings.

FIGS. 1A to 1I are views showing an example of the method for forming a pattern according to the first embodiment.

As shown in FIG. 1A, a processed layer 2 is first formed on a substrate 1.

Figure 1B:
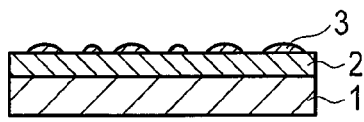

Subsequently, as shown in FIG. 1B, an island-like metal underlayer 3 is formed on the processed layer 2.

Figure 1C:
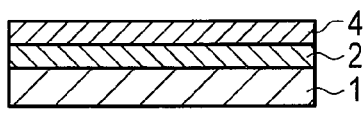

Subsequently, as shown in FIG. 1C, a phase-separated release layer 4 is formed on the processed layer 2 and the metal underlayer 3. Here, the island-like metal underlayer 3 is alloyed with the phase-separated release layer 4 and dissolved together with the phase-separated release layer in the following lift-off process.

Figure 1D:
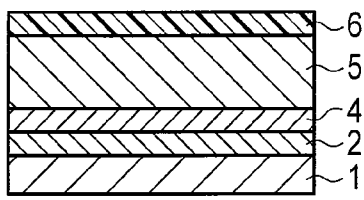

Thereafter, as shown in FIG. 1D, a mask layer 5 and a resist layer 6 are formed on the phase-separated release layer 4.

Figure 1E:
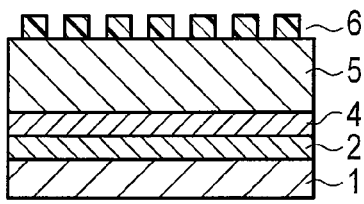

Further, as shown in FIG. 1E, the resist layer 6 is pattern processed to form a concave-convex pattern.

Figure 1F:
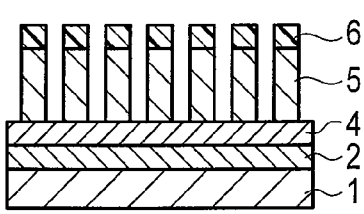

Subsequently, as shown in FIG. 1F, the concave-convex pattern is transferred to the mask layer 5.

Figure 1G:
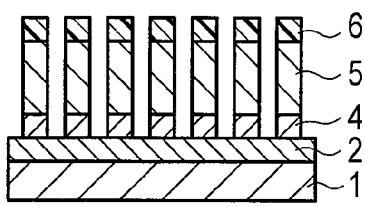

Subsequently, as shown in FIG. 1G, the concave-convex pattern is transferred to the phase-separated release layer 4.

Figure 1H:
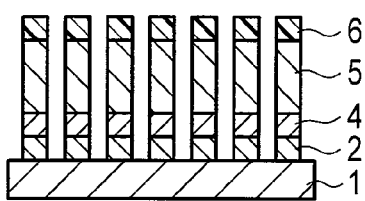

Subsequently, as shown in FIG. 1H, the concave-convex pattern is transferred to the processed layer 2.

Figure 1I:
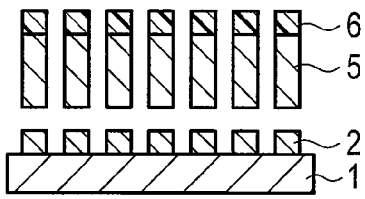

Thereafter, as shown in FIG. 1I, the phase-separated release layer 4 is dissolved and removed, and the mask layer 5 is removed from the processed layer 2.

Concave-convex processing can be performed on the processed layer 2 in the above manner.

FIGS. 2A to 2J show an example of the method for producing a magnetic recording medium according the second embodiment.

Figure 2A:
FIGS. 2A, 2B, 2C, 2D, 2E, 2F, 2G, 2H, 2I, and 2J are views showing an example of a method for producing a magnetic recording medium according to a second embodiment.
Figure 2B:
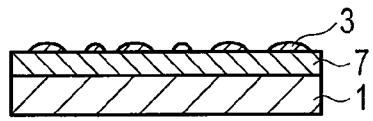
Figure 2C:
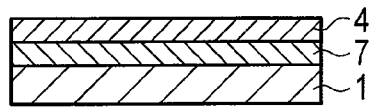
Figure 2D:
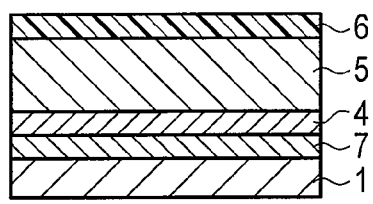
Figure 2E:
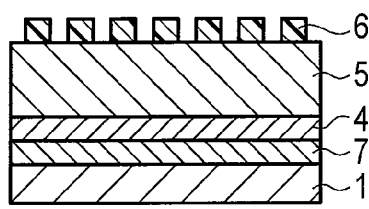
Figure 2F:
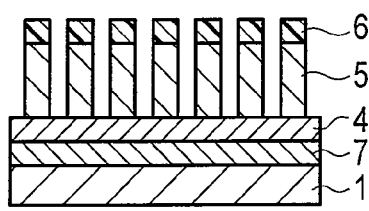
Figure 2G:
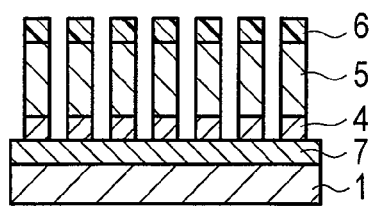
Figure 2H:
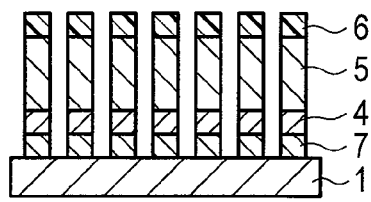
Figure 2I:
Figure 2J:
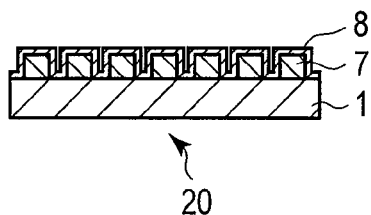

As shown, a magnetic recording medium 20 can be obtained similarly to FIGS. 1A to 1I except that a magnetic recording layer 7 is used in place of the processed layer 2, the phase-separated release layer 4 is dissolved and removed as shown in FIG. 2I, the mask layer 5 is removed from the magnetic recording layer 7, and further a protective layer 8 is formed on the magnetic recording layer 7 as shown in FIG. 2J.

FIGS. 3A to 3K show another example of the method for producing a magnetic recording medium according the second embodiment.

As shown, a magnetic recording medium 30 can be obtained similarly to FIGS. 2A to 2J except that a transfer layer 9 is formed on the mask layer 5 before forming the resist layer 6 in FIG. 3D, and the concave-convex pattern of the resist layer 6 is transferred to the transfer layer 9 before transferring it to the mask layer 5 as shown in FIG. 3F.

FIGS. 4A to 4L show another example of the method for producing a magnetic recording medium according the second embodiment.

Figure 4A:
FIGS. 4A, 4B, 4C, 4D, 4E, 4F, 4G, 4H, 4I, 4J, 4K, and 4L are views showing another example of views showing another example of the method for producing a magnetic recording medium according to the second embodiment.
Figure 4B:
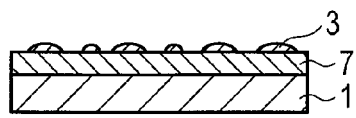
Figure 4C:
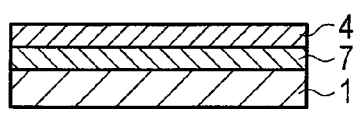
Figure 4D:
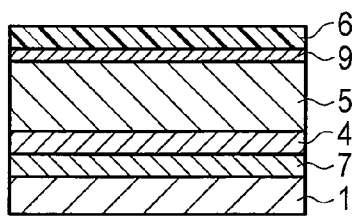
Figure 4E:
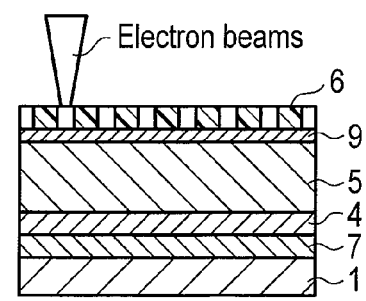
Figure 4F:
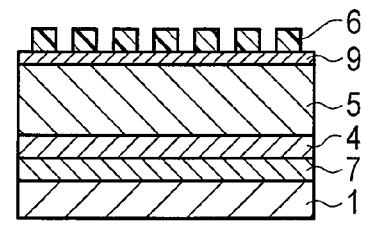
Figure 4G:
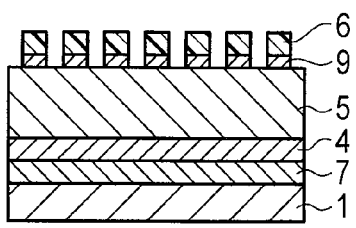
Figure 4H:
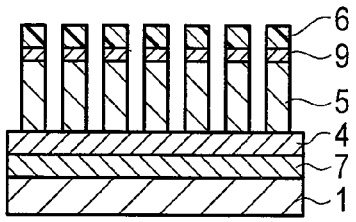
Figure 4I:
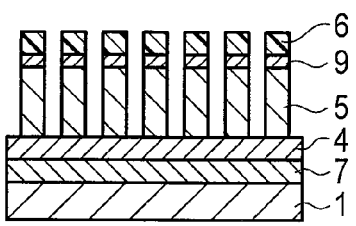
Figure 4J:
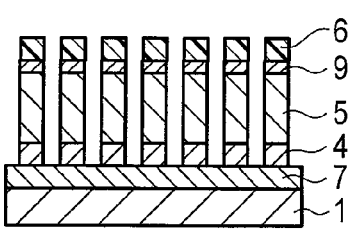
Figure 4K:
Figure 4L:
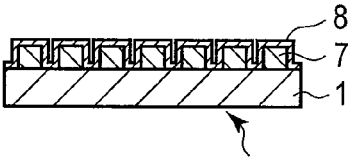

When forming the concave-convex pattern of the resist layer 6, electron beam lithography can be carried out. As shown, a magnetic recording medium 40 can be obtained similarly to FIGS. 3A to 3K except that the resist layer 6 is first subjected to electron beam exposure as shown in FIG. 4E, the pattern after exposure is developed, and the concave-convex pattern is formed on the resist layer 6 as shown in FIG. 4F.

FIGS. 5A to 5M show another example of the method for producing a magnetic recording medium according the second embodiment.

Figure 5A:
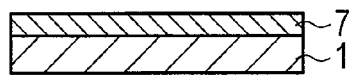
FIGS. 5A, 5B, 5C, 5D, 5E, 5F, 5G, 5H, 5I, 5J, 5K, 5L, and 5M are views showing another example of views showing another example of the method for producing a magnetic recording medium according to the second embodiment.
Figure 5B:
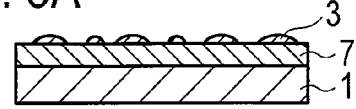
Figure 5C:
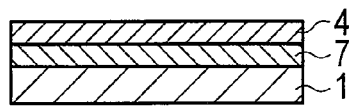
Figure 5D:
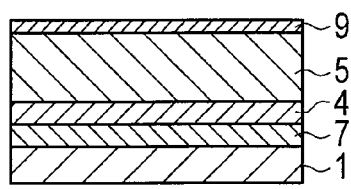
Figure 5E:
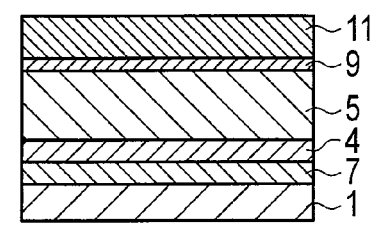
Figure 5F:
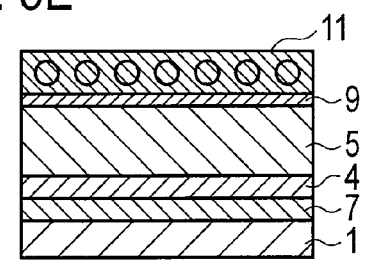
Figure 5G:
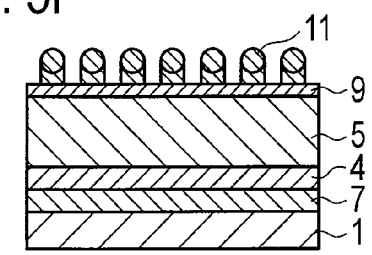
Figure 5H:
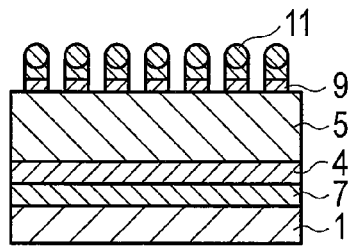
Figure 5I:
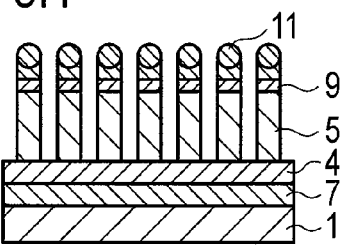
Figure 5J:
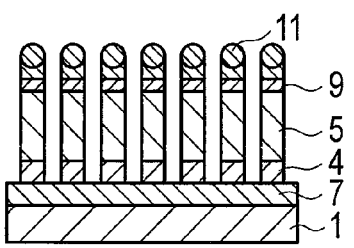
Figure 5K:
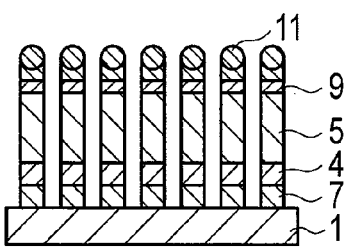
Figure 5L:
Figure 5M:
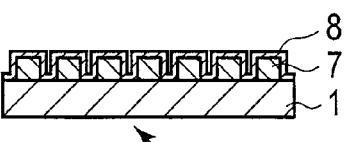

Alternatively, as the concave-convex pattern of the resist layer, a self-assembled film can be used. As shown, a magnetic recording medium 50 can be obtained similarly to FIGS. 3A to 3K except that a self-assembled polymer layer 10 containing at least two polymer chains is first formed on the transfer layer instead of forming the resist layer 6 on the transfer layer 9 of FIG. 3D as shown in FIG. 5E, energy is applied to the polymer layer 10 to form a microphase-separated structure in the film as shown in FIG. 5F in place of FIG. 3E, and the pattern is transferred to the transfer layer using the concave-convex portions of the phase-separated structure as shown in FIG. 5G.

FIGS. 6A to 6H show an example of the method for producing a stamper according the third embodiment.

As shown in FIG. 6A, the island-like metal underlayer 3 is first formed on the substrate 1.

Subsequently, as shown in FIG. 68, the phase-separated release layer 4 is formed on the substrate 1 and the island-like metal underlayer 3.

Thereafter, as shown in FIG. 6C, the resist layer 6 is formed on the phase-separated release layer 4.

Further, as shown in FIG. 6D, the resist layer 6 is pattern-processed to form a concave-convex pattern.

Subsequently, as shown in FIG. 6E, a conductive layer 12 is formed on the resist layer 6 and the phase-separated release layer 4 along the concave-convex pattern.

Subsequently, as shown in FIG. 6F, electroplating is performed using the conductive layer 12 as an electrode to form an electroformed layer 14.

Subsequently, as shown in FIG. 6G, the phase-separated release layer 4 is dissolved and removed, and the substrate 1 is removed from the electroformed layer 14.

Thereafter, as shown in FIG. 6H, the resist layer remained on the electroformed layer is removed.

A stamper 60 is obtained in the above manner.

FIGS. 7A to 7J show another example of the method for producing a stamper according the third embodiment.

As shown, a stamper 70 can be obtained similarly to FIGS. 6A to 6H except that the mask layer 5 and the transfer layer 9 are formed between the phase-separated release layer 4 and the resist layers 6 as shown in FIG. 7C instead of forming the resist layer 6 on the phase-separated release layer 4 of FIG. 6C, the concave-convex pattern is transferred to the transfer layer 9 as shown in FIG. 7E before forming the conductive layer of FIG. 6E, and the concave-convex pattern is transferred to the mask layer 5 as shown in FIG. 7F.

FIGS. 8A to 8I and FIGS. 8J to 8M show another example of the method for producing a magnetic recording medium according the second embodiment.

Figure 8A:
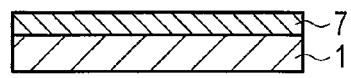
FIGS. 8A, 8B, 8C, 8D, 8E, 8F, 8G, 8H, 8I, 8J, 8K, 8L, and 8M are views showing another example of views showing another example of the method for producing a magnetic recording medium according to the second embodiment.
Figure 8B:
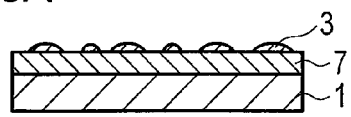
Figure 8C:
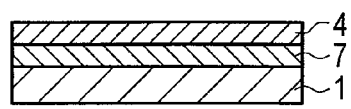
Figure 8D:
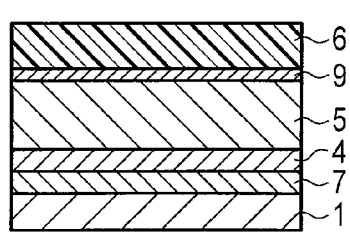
Figure 8E:
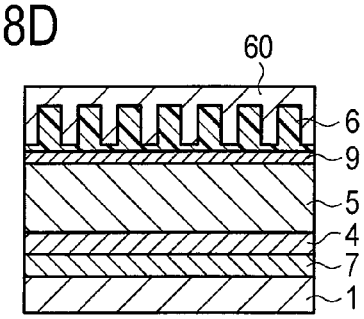
Figure 8F:
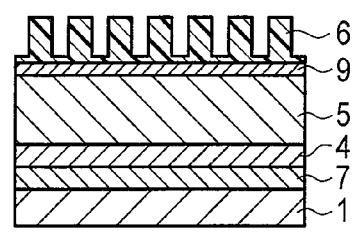
Figure 8G:
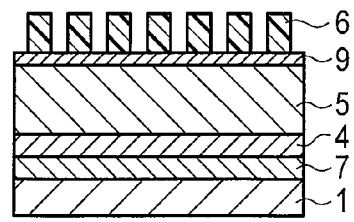
Figure 8H:
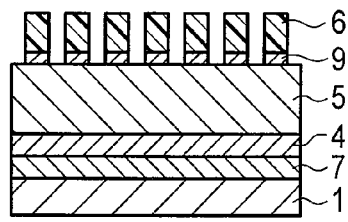
Figure 8I:
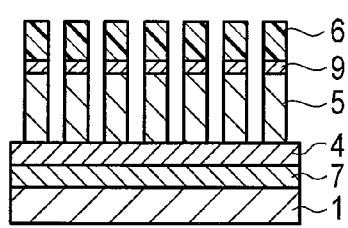
Figure 8J:
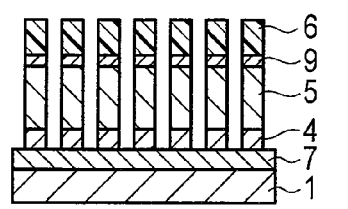
Figure 8K:
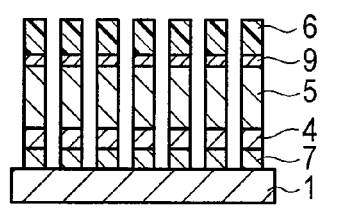
Figure 8L:
Figure 8M:
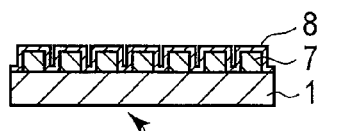

As shown in FIGS. 8A to 8I and FIGS. 8J to 8M, a stamper 80 can be obtained similarly to FIGS. 3A to 3K except that an imprint stamper 60 is pushed into the resist layer 6 as shown in FIG. 8E instead of pattern processing of the resist layer 6 of FIG. 3E and forming the concave-convex pattern, the imprint stamper 60 is peeled off as shown in FIG. 8F, the concave-convex pattern is transferred to one surface of the magnetic recording medium, and a residue at the concave portion is removed as shown in FIG. 8G.

FIG. 9 shows another example of the method for producing a magnetic recording medium according the second embodiment.

As shown, a concave-convex pattern is formed by the phenomenon of self-assembly of metal fine particles in which a finely regulated pattern can be formed on a mask.

Figure 9A:
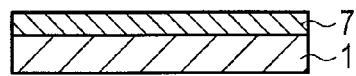
FIGS. 9A, 9B, 9C, 9D, 9E, 9F, 9G, 9H, 9I, 9J, and 9K are views showing another example of views showing another example of the method for producing a magnetic recording medium according to the second embodiment.

As shown in FIG. 9A, the magnetic recording layer 7 is first formed on the substrate 1.

Figure 9B:
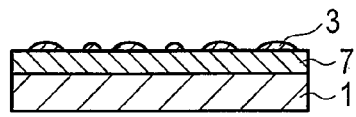

Next, as shown in FIG. 9B, the island-like metal underlayer 3 is formed on the magnetic recording layer 7.

Figure 9C:
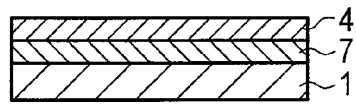

Subsequently, as shown in FIG. 9C, the phase-separated release layer 4 is formed on the magnetic recording layer 7 and the island-like metal underlayer 3.

Figure 9D:
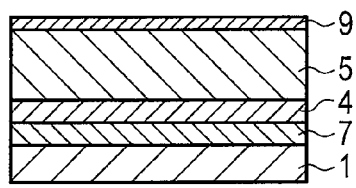

Thereafter, as shown in FIG. 9D, the mask layer 5 and the transfer layer 9 are formed on the phase-separated release layer 4.

Figure 9E:
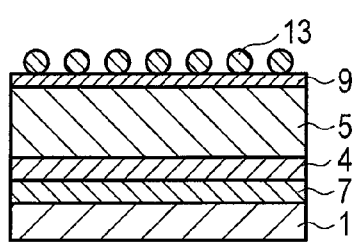

Further, as shown in FIG. 9E, a metal fine particle dispersion containing metal fine particles and an organic solvent is applied onto the transfer layer 9, and dried to from a concave-convex pattern comprised of a metal fine particle mask layer 13.

Figure 9F:
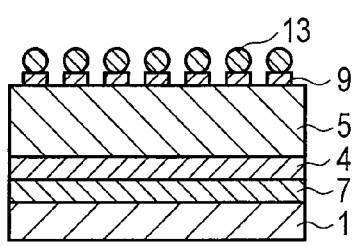

Subsequently, as shown in FIG. 9F, the concave-convex pattern is transferred to the transfer layer 9.

Figure 9G:
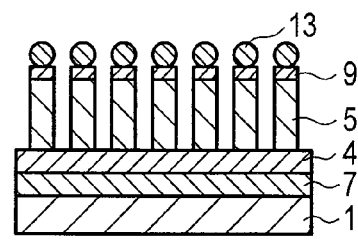

Subsequently, as shown in FIG. 9G, the concave-convex pattern is transferred to the mask layer 5.

Figure 9H:
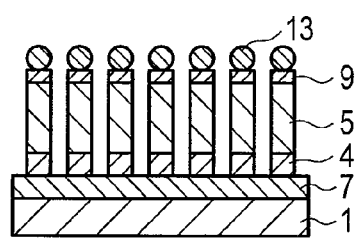

Subsequently, as shown in FIG. 9H, the concave-convex pattern is transferred to the phase-separated release layer 4.

Figure 9I:
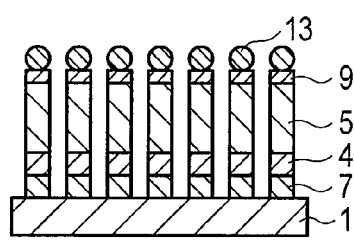

Subsequently, as shown in FIG. 9I, the concave-convex pattern is transferred to the magnetic recording layer 7.

Figure 9J:

Subsequently, as shown in FIG. 9J, the phase-separated release layer 4 is dissolved and removed, and the mask layer 5 is removed from the magnetic recording layer 7.

Figure 9K:
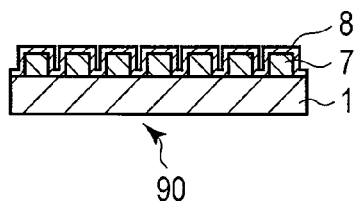

Thereafter, as shown in FIG. 9K, the protective layer 8 is formed on the magnetic recording layer 7.

A magnetic recording medium 90 is obtained in the above manner.

FIG. 10 shows another example of the method for producing a magnetic recording medium according the second embodiment.

As shown, a magnetic recording medium 100 can be obtained similarly to FIGS. 9A to 9K except that a metal fine particle dispersion containing metal fine particles, an organic solvent, and further a binder comprised of an organic compound as shown in FIG. 10E instead of applying the metal fine particle dispersion containing metal fine particles and an organic solvent in FIG. 9E, and a binder layer 14 containing metal fine particles 13 is formed, the most part of the binder layer 14 covering the periphery of the metal fine particles 13 is removed as shown in FIG. 10F, and a concave-convex pattern comprised of the metal fine particles 13 and the binder layer 14 at the lower portion of the metal fine particles 13 is formed.

According to the method for a pattern according to the embodiment, abnormal projections in the surface are decreased by reducing releasing defects so that a fine pattern having excellent size uniformity can be obtained.

According to the method for producing a magnetic recording medium according to the embodiment, concave-convex processing which leaves little residues during peeling can be performed using a release layer excellent in surface smoothness, and there is provided a magnetic recording medium comprising a magnetic recording layer having a fine pattern having excellent size uniformity. Further, the magnetic recording medium is excellent in in-plane uniformity. Accordingly, the glide characteristics at the time of head scanning of the medium are improved. Further, a fine pattern suitable for high recording density can be simply produced, and thus the production process can be simplified.

According to the method for producing a stamper according to the embodiment, because of the release layer which satisfies the surface smoothness and lifting-off of the release layer, a stamper comprising a fine pattern having little in-plane distortion, good surface smoothness, and excellent size uniformity can be formed.

The methods according to FIGS. 1A to 10L can be performed in combination with one another, as necessary.

Hereinafter, details of the embodiments will be described.

Process of Forming Magnetic Recording Layer

First, a magnetic recording layer is formed on a substrate to obtain a magnetic recording medium.

There is no restriction on the shape of the substrate. Usually, a round and hard substrate is used. For example, a glass substrate, a metal-containing substrate, a carbon substrate, a ceramic substrate or the like is used. In order to make the in-plane uniformity of the pattern excellent, it is possible to reduce the concave-convex portions on the surface of the substrate. If necessary, it is possible to form a protective film like an oxide film on the surface of the substrate.

For example, amorphous glass represented by soda lime glass and aluminosilicate glass or crystallized glass represented by lithium-based glass may be used as the glass substrate. A sintered substrate which contains alumina, aluminum nitride, and silicon nitride as main components may be used as the ceramic substrate.

A magnetic recording layer having a perpendicular magnetic recording layer which contains cobalt as a main component can be formed on the substrate.

If necessary, it is possible to form a soft under layer (SUL) having high magnetic permeability between the substrate and the perpendicular magnetic recording layer. The soft under layer shares responsibility for the magnetic recording head function of circulating a record magnetic field from a magnetic recording head which magnetizes the perpendicular magnetic recording layer. The recording/reproduction efficiency can be improved by applying a steep sufficient perpendicular magnetic field to the recording layer in the magnetic field.

For example, materials including Fe, Ni, and Co may be used as the soft under layer. Among those materials, amorphous materials which have no magnetocrystalline anisotropy, crystal defects, and grain boundary and exhibit excellent soft magnetism may be used. The low noise of the recording medium can be achieved by using a soft magnetic amorphous material. As the soft magnetic amorphous material, for example, a Co alloy which contains Co as a main component and contains at least one of Zr, Nb, Hf, Ti, and Ta (e.g., CoZr, CoZrNb, and CoZrTa) may be selected.

An underlayer can be formed between the soft under layer and the substrate to improve the adhesion of the soft under layer. As the underlayer material, for example, at least one material selected from Ni, Ti, Ta, W, Cr, Pt and alloys thereof, oxides thereof, and nitrides thereof may be used. As the underlayer material, for example, NiTa and NiCr may be used. These underlayers may be formed of a multilayer.

Further, an intermediate layer of a non-magnetic metal material may be formed between the soft under layer and the perpendicular magnetic recording layer. The intermediate layer has two roles of blocking an exchange bonding interaction between the soft under layer and the perpendicular magnetic recording layer and controlling the crystallinity of the perpendicular magnetic recording layer. The material of the intermediate layer may be selected from Ru, Pt, Pd, W, Ti, Ta, Cr, Si, alloys thereof, oxides thereof, and nitrides thereof.

The perpendicular magnetic recording layer may contain Co as a main component, contain at least Pt, and further contain a metal oxide. The perpendicular magnetic recording layer may further contain one or more elements selected from B, Ta, Mo, Cu, Nd, W, Nb, Sm, Tb, and Ru, in addition to Pt and Co. If the layer further contains the elements, the microparticulation of the magnetic particles can be facilitated, and the crystallinity and orientation can be improved. Accordingly, recording/reproduction characteristics suitable for high recording density and thermal decay characteristics can be obtained. Specifically, a CoPt-based alloy, a CoCr-based alloy, a CoCrPt-based alloy; and CoPtO, CoPtCrO, CoPtSi, CoPtCrSi, and $CoCrSiO_2$ alloys may be used for the perpendicular magnetic recording layer.

The thickness of the perpendicular magnetic recording layer may be set to 1.0 nm or more in order to measure a reproduced output signal with high accuracy. The thickness may be set to 40 nm or less in order to suppress intensity distortion of the signal. If the thickness is smaller than 1.0 nm, there is a tendency that a reproduced output is low and a noise component is dominant. On the other hand, when the thickness is larger than 40 nm, there is a tendency that the reproduced output becomes excessive and distortion in signal waveforms occurs.

A protective layer may be formed on the upper portion of the perpendicular magnetic recording layer. The protective layer is effective in preventing the corrosion and deterioration of the perpendicular magnetic recording layer and preventing damages on the surface of the medium when the magnetic recording head is in contact with the recording medium. Examples of protective layer materials include materials including C, Pd, $SiO_2$, and $ZrO_2$. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to $sp^2$-bonded carbon. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness and therefore it can be used as the protective layer for the magnetic recording layer.

A lubricant layer may be further formed on the upper portion of the protective layer. Examples of lubricants used for the lubricant layer include perfluoropolyether, fluoroalcohol, and fluorinated carboxylic acid.

Process of Forming Phase-Separated Release Layer

Subsequently, a phase-separated release layer is formed on a processed layer.

When a fine pattern is formed by lift-off, if the release layer is thin, peel properties are inhibited, a residue at the concave-convex portion tends to be generated. On the other hand, if the release layer is thick, the process margin cannot be ensured, and concave-convex transfer unevenness tends to be caused. Therefore, it is necessary to be easy to process even a thick release layer, that is, the processing rate can be fast. Further, in order to make peeling easy, the dissolution rate needs to be fast. Additionally, in order to reduce the damage on the surrounding pattern at the time of dissolving the release layer, it is necessary to set the concentration of the peeling liquid to a low level. With this, it is essential to use a release layer material which may be dissolved in even the peeling liquid with a low concentration level. Further, the surface smoothness of the release layer is a parameter directly linked to the uniformity when patterning the upper mask layer and the resist layer. Thus, the layer can be formed as a smoother layer.

According to the embodiments, the use of the phase-separated release layer allows all of the problems to be solved.

Figure 11:
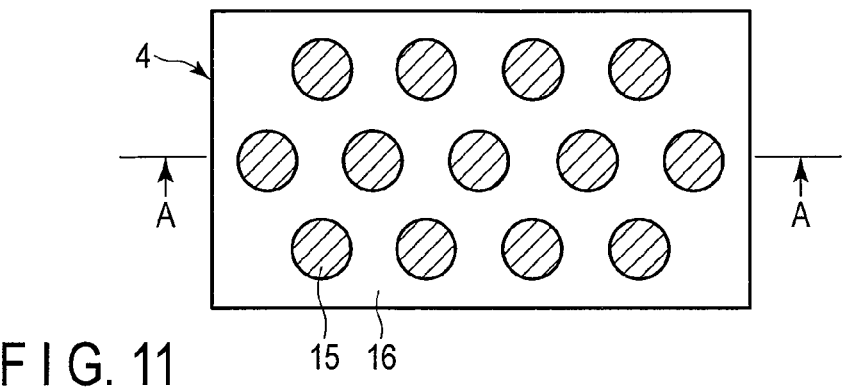
FIG. 11 is a pattern diagram showing an example of the configuration of the upper surface of a phase-separated release layer.

FIG. 11 is a view schematically showing the upper surface as an example of the configuration of the phase-separated release layer in the embodiments.

Figure 12:
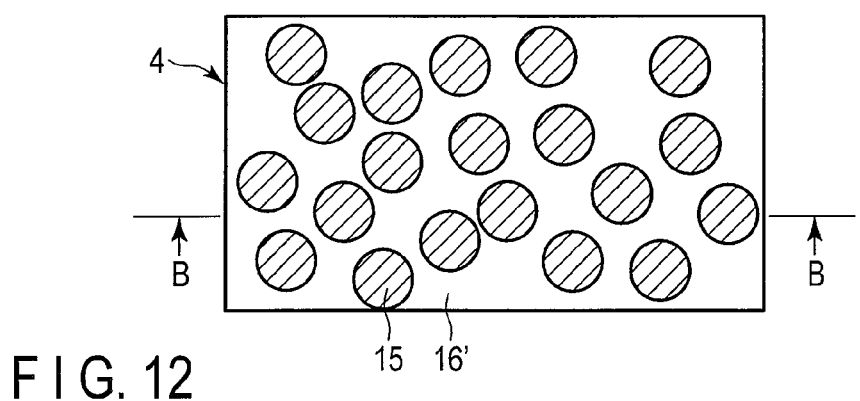
FIG. 12 is a pattern diagram showing another example of the configuration of the upper surface of a phase-separated release layer.

FIG. 12 is a view schematically showing the upper surface as another example of the configuration of the phase-separated release layer in the embodiments.

Figure 13:
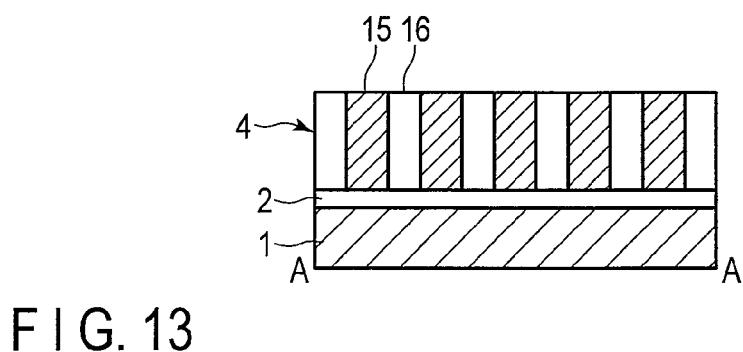
FIG. 13 is an A-A cross-sectional view of FIG. 12.
Figure 14:
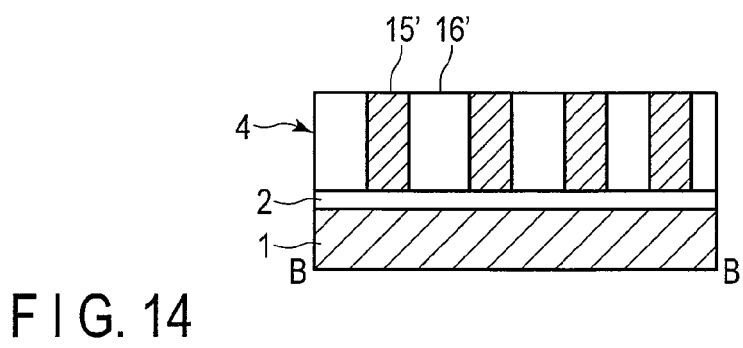
FIG. 14 is a B-B cross-sectional view of FIG. 13.

FIG. 13 is an A-A cross-sectional view of FIG. 11, and FIG. 14 is a B-B cross-sectional view of FIG. 12.

As shown in the drawing, the phase-separated release layer 4 includes a structure separated into a phase 15 including the first metal and the second metal and a phase 16 comprised of a metal oxide. Each of the phases may become a periodic pattern as shown in FIG. 11 or a non-periodic pattern of FIG. 12 (a so-called granular structure). Among various phase-separated structures, each of the phases as shown in FIGS. 11 and 12 may become a columnar phase-separated structure grown in a direction perpendicular to the surface of the substrate because the phases satisfy excellent peel properties which are required after transfer of the concave-convex pattern. The same drawing shows the phase 15 having a columnar island pattern comprised of the first metal and the second metal and the phase 16 having a sea pattern comprised of the metal oxide. The phases may be reversed depending on the composition of the first metal, the second metal, and the metal oxide. The pitch of the columnar pattern and the sea-like pattern may be in the same range as the pitch of the concave-convex pattern for processing the mask layer. However, it is not necessarily necessary to form the periodic structure.

In order to exhibit excellent microphase separation in the release layer, the island-like pattern is first formed on the processed layer. The island-like pattern exerts an effect in the subsequent process of forming the phase-separated release layer and becomes a core for forming a clear microphase-separated structure. On the contrary, when it is not present, the phase-separated release layer becomes an alloy layer and cannot exhibit excellent peel properties. The island-like metal underlayer may be comprised of a metal soluble in an acid or alkali solution. The island-like metal underlayer can be formed by various methods such as sputtering. Since it is necessary to form a structure separated on the same surface, for example, high-pressure sputtering can be used.

Subsequently, a phase-separated release layer is formed. As described above, the phase-separated release layer has the microphase-separated structure comprised of two kinds of materials having different properties. A typical phase-separated structure is a columnar (cylinder) structure extended in a substrate thickness direction. In order to clearly form the phase-separated structure, the phase-separated release layer can be formed of two kinds of soluble metals and one kind of oxide. When the layer is formed of one kind of soluble metal and one kind of oxide, the mixing of them is significant. Thus, the layer is formed as an alloy layer and it is not possible to obtain an excellent releasing rate.

An island-like perpendicular cylinder pattern comprised of two kinds of alloys and a sea-like matrix pattern comprised of one kind of oxide are included in the layer. Due to the segregation of the matrix pattern of them, the processing rate is shifted from the case of only the materials forming the cylinder pattern to the case of only the matrix pattern. Accordingly, the use of an oxide material for the matrix pattern allows the processing rate faster than that of the conventional alloy release layer to be realized. Since the material of the alloy cylinder pattern which is a soluble part is diffused into the inside of the oxide matrix, it can be dissolved without impairing the solubility of the whole film. Further, the net density of the dissolved metal is low due to the presence of the oxide. Thus, the dissolution rate is faster than that of a metal simple substance. Further, self-assembling microphase separation of the cylinder and matrix patterns at the upper portion of the release layer is stopped and the patterns ensure a balance with the energy in free space. Thus, the surface properties, that is, the surface smoothness of the film surface are excellent as compared with those of a single metal, a single alloy, and a single oxide and the surface roughness is improved. Accordingly, it is possible to realize a release layer capable of improving all of the releasing rate, the processing rate, and the surface flatness.

Process of Forming Mask Layer

A mask layer for transferring a concave-convex pattern is formed on a magnetic recording layer.

When the protective layer is formed on the magnetic recording layer, the mask layer can be formed on the protective layer.

The mask layer becomes a main mask in the processing of the magnetic recording layer. Thus, a material to maintain the etching selectivity between the magnetic recording layer and the metal fine particle material as described below can be used. As a specific material, a material which is selected from the group consisting of Al, C, Si, Ti, V, Cr, Mn, Co, Ni, Cu, Fe, Zn, Ga, Zr, Nb, Mo, Ru, Pd, Ag, Au, Hf, Ta, W, Pt, and is comprised of compounds or alloys thereof may be applied for the mask layer. Here, the compound is selected from, for example, oxides, nitrides, borides, and carbide. The alloy is comprised of two or more materials selected from the above group. In this case, the mask layer material which can ensure the etching selectivity between the material of the metal fine particle film formed on the mask layer and the size of the concave-convex pattern is selected. Further, the film thickness can be appropriately determined.

These mask layers may be formed by methods such as, vacuum deposition, electron-beam vacuum deposition, molecular-beam-deposition, ion-beam-deposition, ion plating, physical vapor deposition (PVD), chemical vapor deposition (CVD) using heat, light, and plasma, represented by spattering.

In the physical and chemical vapor deposition, the thickness of the mask layer can be adjusted by appropriately changing parameters such as the process gas pressure, the gas mass flow, the substrate temperature, the power supply, the ultimate vacuum, the chamber atmosphere, and the film formation time. The arrangement accuracy of the metal fine particle layer formed at the upper portion of the mask layer and the transfer accuracy of the concave-convex pattern strongly depend on the surface roughness of the mask layer. Therefore, it is possible to previously reduce the surface roughness of the mask layer. This is achieved by variously adjusting the film formation conditions. In order to pattern a narrow pitch with high resolution, the cycle of surface roughness based on a desired pattern pitch can be short. The average surface roughness may be set to 0.6 nm or less. This is because if the roughness is higher than 0.6 nm, the accuracy of arrangement of metal fine particles described below is worsened and the S/N signal from the magnetic recording medium is deteriorated.

It is possible to realize the reduction in the surface roughness by variously changing the film formation conditions and changing the material of the mask layer from a crystalline material to an amorphous material.

The thickness of the mask layer can be determined, taking into consideration the etching selectivity between the release layer and the magnetic recording layer and the size of the concave-convex pattern. When the mask layer is formed, the adjustment is achieved by changing parameters such as the process gas pressure, the gas mass flow, the substrate temperature, the power supply, the ultimate vacuum, the chamber atmosphere, and the film formation time. As the sputtering gas used for the film formation, a rare gas including Ar may be mainly used. According to the mask material for forming the film, reactive gases such as $O_2$ and $N_2$ may be mixed to form a desired alloy film.

The thickness of the mask layer may be set to a range of 1 nm to 50 nm to transfer a fine pattern with high resolution. If the thickness is smaller than 1 nm, the mask layer is not uniformly formed, while if the thickness is larger than 50 nm, the transfer accuracy of the concave-convex pattern in a depth direction tends to deteriorate.

As described below, the concave-convex pattern is formed on the magnetic recording layer through the mask layer and then the mask layer is removed so that a magnetic recording layer having a concave-convex pattern can be produced. Here, when the mask layer is removed, the method such as dry etching or wet etching is used. The release layer is previously formed between the mask layer and the magnetic recording layer and then the layer is removed so that the mask layer can be peeled off from the top of the magnetic recording layer.

One or two layers of the mask layer can be formed. The mask layer can be formed into, for example, a laminate including a first mask layer and a second mask layer. For example, the first mask layer and the second mask layer are formed of different materials so that the etching selectivity can be increased and the transfer accuracy can be improved. For convenience sake, the second mask layer is referred to as "transfer layer to the first mask layer. The magnetic recording layer, the mask layer, and the transfer layer are shown in this order from the substrate side.

The material of the transfer layer may be appropriately selected from various materials, taking into consideration the etching selectivity between the metal fine particle material and the mask layer material. When the combination of the mask material is determined, an etching solution or a metal material corresponding to the etching gas may be selected. When the dry etching is assumed and each material is combined, examples of the combination include C/Si, Si/Al, Si/Ni, Si/Cu, Si/Mo, Si/MoSi$_2$, Si/Ta, Si/Cr, Si/W, Si/Ti, Si/Ru, and Si/Hf in the order of the mask layer and the transfer layer from the substrate side. The configuration in which Si is replaced with SiO$_2$, Si3N$_4$, SiC or the like may be used. Further, laminates such as Al/Ni, Al/Ti, Al/TiO$_2$, Al/TiN, Cr/Al$_2$O$_3$, Cr/Ni, Cr/MoSi$_2$, Cr/W, GaN/Ni, GaN/NiTa, GaN/NiV, Ta/Ni, Ta/Cu, Ta/Al, and Ta/Cr may be selected. Depending on the etching gas to be used in the mask processing, the stacking sequence of the various mask materials can be replaced.

The combination of the mask material and the stacking sequence are not limited thereto. From the viewpoint of the pattern size and the etching selectivity, they may be appropriately selected. Patterning can be performed by dry etching and wet etching. Thus, taking into consideration this, each mask material may be selected.

When the mask layer is patterned by wet etching, the side etch in the width direction of the concave-convex pattern is suppressed. This is achieved by setting various parameters such as the composition of the mask material, the concentration, and the etching time of the etching solution.

Here, the surface roughness after formation of the mask layer in the case of using the phase-separated release layer and the case of using the conventional single metal film for the release layer will be shown. For example, in the case of using the phase-separated release layer comprised of Mo, W, and SiO$_2$ like the following example, when the surface roughness of a 5-nm-thick release layer formed on the non-processed layer on the substrate is actually measured with the atomic force microscope, it is very small (0.288 nm). When the mask layer is formed on this surface, even if it the thickness of the mask is increased, the influence of deterioration in surface smoothness is minimized. This is because the surface roughness of the release layer is excellent. When a C mask is actually formed by sputtering, changes in average surface roughness are 0.32 nm, 0.39 nm, and 0.42 nm, for a 10-nm-thick film, a 20-nm-thick film, a 30-nm-thick film, respectively. The use of a thick film mask allows a pattern with small variation in size to be formed. In contrast, for example, when a 5-nm-thick alloy release layer comprised of Mo and W like the conventional product is used, the average surface roughness becomes 0.38 nm at the time of forming the release layer on the processed layer. Further, the C mask is formed, and the average surface roughness for a 10-nm-thick film is 0.46 nm, the average surface roughness for a 20-nm-thick film is 0.58 nm, and the average surface roughness for a 30-nm-thick film is 0.643 nm. The surface smoothness is remarkably deteriorated. This is because, as for the surface smoothness at the time of forming the release layer, the mask layer is formed so that the concave-convex pattern is traced. In this case, it is not possible to increase the thickness of the mask layer. Therefore, when the conventional material is used, the thickness of the mask layer has to be decreased. Consequently, it becomes difficult to form a pattern with small variation in size. On the other hand, even in the case of the release layer having the same thickness, the phase-separated release layer is excellent in surface smoothness. Thus, the process margin can be enlarged by increasing the thickness of the mask layer.

Process of Forming Concave-Convex Pattern on Resist Layer

In order to form a fine concave-convex pattern on the resist layer, for example, resists for ultraviolet ray and electron beam exposure as represented by novolak resins, nanoimprint resists having a hardening action by heat or UV irradiation, polymeric self-assembled films, and metal fine particles can be used.

The resist layer to be used when performing exposure or nanoimprinting can be formed by applying a precursor solution of a resist material. In this case, the thickness of the resist layer can be determined by taking into consideration the pattern pitch and the etching selectivity with respective to the mask layer of the lower layer.

In the method for coating the coating liquid, the substrate can be coated by various methods such as spin-coating, spray-coating, spin-casting, dip-coating, and ink-jetting. Since the resist layer immediately after coating contains a large amount of solvent, it is possible to prebake the layer to decrease the fluidity of the resist material. When the adhesion of the resist layer to the mask layer is poor, the surface of the mask layer can be pretreated. Specific examples thereof include a baking process including removing water in the mask layer and a hydrophobing treatment based on coating with a hexamethyldisilazane solution.

The resist layer may have not only a single layer, but also a multilayer structure which is obtained by forming, for example, resist layers having different exposure sensitivity according to the transfer process.

The kind of the resist material is not particularly limited. Various resist materials such as main-chain-cut type, chemically-amplified type, and cross-linked type resists can be used.

A self-assembled layer for forming a concave-convex pattern is formed on the upper portion of the mask layer, and then the resultant layer can be transferred to the concave-convex pattern. The self-assembled film is represented by a diblock copolymer having at least two different polymer chains. The basic structure is such that terminals of polymers having different chemical characteristics are covalently bound, like (block A)-(block B). The self-assembled film is not limited to the diblock copolymer. Additionally, triblock and random copolymers can be used depending on the combination of the materials.

Examples of materials for forming polymer block include polyethylene, polystyrene, polyisoprene, polybutadiene, polypropylene, polydimethylsiloxane, polyvinyl pyridine, polymethylmethacrylate, polybutyl acrylate, polybutyl methacrylate, polydimethylacrylamide, polyethylene oxide, polypropylene oxide, polyacrylic acid, polyethylacrylic acid, polypropyl acrylic acid, polymethacrylic acid, polylactide, polyvinyl carbazole, polyethylene glycol, polycaprolactone, polyvinylidene fluoride, and polyacrylamide. Two or more different polymers of these examples are used to form a block copolymer.

A self-assembled film using a block copolymer can be formed on the mask layer by spin-coating. In this case, a solvent which dissolves the polymers forming each phase is selected. The solution in which the polymers are dissolved can be used as the coating liquid.

As a specific solvent, for example, toluene, xylene, hexane, heptane, octane, ethylene glycol monoethyl ether, ethylene glycol monomethyl ether, ethylene glycol monomethyl ether acetate, propylene glycol monomethyl ether acetate, ethylene glycol trimethyl ether, ethyl lactate, ethyl pyruvate, cyclohexanone, dimethylformamide, dimethylacetamide, tetrahydrofuran, anisole or diethylene glycol triethyl ether may be selected.

The thickness of the self-assembled film can be changed using the concentration of a coating liquid obtained using the solvents or various parameters set at the time of film formation.

When energy such as heat is applied to the self-assembled film, polymers are phase-separated, and a microphase-separated structure is formed in the film. The microphase-separated structure shows different conformations according to the molecular weight of the polymers forming the self-assembled film. For example, in the case of the diblock copolymer, an island-like dot or cylinder structure of a polymer B is formed on a sea-like (matrix) pattern of a polymer A. Additionally, a lamellar structure in which the polymers A and B are laminated on the same flat surface or a sphere structure in which sea-island patterns are reversed may be formed. One of the polymer phases in the pattern is selectively removed so that a concave-convex pattern of the self-assembled film can be formed.

When the microphase-separated structure of the self-assembled film is formed, energy is applied from the outside. The energy can be applied by annealing with heat or so-called solvent annealing that exposes a sample to a solvent atmosphere. In thermal annealing, the temperature is set to an appropriate temperature not to deteriorate the arrangement accuracy of the self-assembled film.

In order to improve the arrangement accuracy of the self-assembled pattern, the upper portion of the mask layer can be chemically modified. Specifically, any one of polymer phases forming a block copolymer is modified to the mask surface so that the arrangement of the block copolymer can be improved. In this case, the surface modification at a molecular level is achieved by applying, annealing, and rinsing the polymer. A pattern having excellent in-plane uniformity can be produced by applying the above block copolymer solution to this surface.

Alternatively, metal fine particles can be used as a mask in order to have a desired pattern pitch. When the metal fine particles are used as a mask layer, the fine particles themselves correspond to the convex portion of the mask layer. Thus, in a range which can maintain this state, it is possible to transfer the pattern to the lower portion.

When the metal fine particles are used, the aggregation of the metal fine particles in a fine particle dispersion can be suppressed. In this case, it is possible to add a dispersant which is surface-active to the particle surface. Further, the particle diameter of secondary particles generated by aggregation is relatively large. This leads to the impairment of the uniformity of the pattern. Thus, the dispersion can be appropriately filtered through a membrane filter.

It is possible to change the solvent of the dispersion in order to correspond to the surface properties of the mask layer. In order to minimize the macroscopic unevenness of the coating, that is, a region where the metal fine particles are not uniformly coated, it is possible to improve coating properties by adding a binder comprised of a polymer material to the dispersion. It is possible to select a polymer material which is soluble in the solvent of the dispersion to prepare the dispersion.

Similarly to a resist solution or a polymer solution of a self-assembled film, the metal fine particle dispersion can be applied to the substrate by various methods including spin coating. In this case, if the metal fine particles focally have a multilayer structure, the transfer uniformity is impaired. Accordingly, it is possible to adjust coating conditions so that a large area on the substrate has a single layer structure.

When it is difficult to transfer the concave-convex pattern to the resist layer, the transfer layer can be inserted between the mask layer and the resist layer. In this case, it is possible to select a material that can ensure the etching selectivity of the resist layer and the mask layer.

Process of Patterning Resist Layer

The concave-convex pattern is formed on the resist layer by etching.

In order to first form the concave-convex pattern on the resist layer, energy beam exposure can be performed. As the exposure method, ultraviolet ray exposure including KrF and ArF, electron beam exposure, charged particle beam exposure, X-ray exposure or the like can be used. It is possible to perform interference exposure, reduced projection exposure, direct exposure or the like in addition to irradiation through a mask for exposure. The exposed portion becomes a latent image in which the resist layer is chemically modified. This image is developed to obtain a concave-convex pattern.

An example of forming a fine pattern by electron beam exposure will be described.

Examples of an electron beam lithography system include an x-y lithographic system having a stage moving mechanism in a biaxial direction perpendicular to the direction of electron beam irradiation, and an x-θ lithographic system in which a rotating mechanism is added to a single-axis moving mechanism. When the x-y lithographic system is used, a stage can be continuously driven so as not to deteriorate the connection accuracy between drawing fields. When a concentric pattern is drawn, the x-θ lithographic system which continuously rotates the stage can be used.

When forming the concentric pattern is formed, the stage driving system and the electron beams may be deflected. In this case, an information processing apparatus (called as a signal source) is used to independently control a deflected signal corresponding to the drawing pattern. In the signal source, it is possible to independently control the deflection pitch of the electron beams, the deflection sensitivity, and the feed per revolution of the drawing stage. Specifically, the drawing pattern can be formed into a concentric shape by sending a deflected signal to the electron beams and a stage moving signal per revolution of the sample.

Subsequently, the resist film is patterned by developing the latent image. As an organic developer to be used for the resist film, examples thereof include ester-based solvents such as methyl acetate, ethyl acetate, butyl acetate, amyl acetate, hexyl acetate, and octyl acetate; ketone-based solvents such as methyl ethyl ketone, methyl isobutyl ketone, propylene glycol monoethyl acetate; aromatic solvents such as anisole, xylene, toluene, and tetralin; and alcohol-based solvents such as ethanol, methanol, and isopropyl alcohol. Further, tetramethylammonium hydroxide, tetrapropylammonium hydroxide or the like can be used as an alkali developer.

Subsequently, the developer on the resist film is substituted and removed by wet rinsing. A rinse liquid used herein may have a soluble relation with the developer. Typical examples thereof include isopropyl alcohol and water. The rinse liquid is not limited to the above solvents as long as it can satisfy the soluble relation. In developing and rinsing, a desired pattern size is obtained by adjusting the developing time in addition to parameters related to the solution, such as the temperature, viscosity, and mixing ratio of the liquid.

Then, a desired resist concave-convex pattern is obtained by drying the rinse liquid on the resist film. As the drying method, a method of directly spraying an inert gas such as N2 on a sample, a method of heating a substrate at a temperature higher than the boiling point of the rinse liquid to volatilize the rinse liquid, a spin drying method, a supercritical drying method or the like can be used. As described above, the concave-convex pattern can be formed on the resist layer by electron-beam lithography.

As another method of forming the concave-convex pattern on the resist layer, a method comprising using a self-assembled layer as the resist layer and forming a concave-convex pattern by etching will be described.

For example, as shown in FIG. 5, the production process is performed similarly to FIGS. 2A to 2J except that a self-assembled layer having at least two kinds of different polymer chains, that is, a block copolymer film is formed as one kind of the resist layer to be formed on the mask layer (FIG. 5E), the self-assembled layer is phase-separated instead of forming the concave-convex pattern on the resist layer (FIG. 5F), and one polymer layer is selectively removed.

The concave-convex pattern is obtained by selectively removing a phase from the block copolymer. For example, in a polystyrene-b-polydimethylsiloxane-based diblock copolymer, a dot pattern of island-like polydimethylsiloxane is formed in sea-like polystyrene by appropriately setting the molecular weight. This pattern is etched and one polymer layer (for example, sea-like polystyrene) is selectively removed to obtain a dot-like concave-convex pattern of polystyrene-b-polydimethylsiloxane.

When forming the concave-convex portions of the self-assembled layer by etching, it is possible to apply wet etching by which a sample is dipped in a chemical liquid, and dry etching using a chemical reaction of active species. In order to precisely transfer the pattern in the thickness direction with respect to the width of fine pattern, it is possible to apply dry etching capable of suppressing etching in the width direction.

In dry etching of a polymer phase, when the kind of an activated gas is appropriately selected, it is possible to perform patterning while maintaining the etching selectivity. Generally, polymer materials containing many C and H atoms such as a benzene ring have high etching resistance and they can be used as masks for concave-convex processing. When polymers having different composition are appropriately combined for use, like a block copolymer, the etching selectivity can be increased. Thus, it is possible to form the concave-convex pattern with higher resolution. For example, as for polystyrene b-polydimethylsiloxane, polydimethylsiloxane can be removed using a fluorine-based gas such as $CF_4$, and polystyrene can be removed using an $O_2$ gas. The etching selectivity therebetween can be ensured.

When it is difficult to directly transfer the self-assembled pattern to the mask of the lower layer, a transfer layer can be separately formed between the self-assembled film and the mask layer. For example, a mask material which can use an etching gas capable of removing one side of the diblock copolymer can be used as the transfer layer. When polystyrene-b-polydimethylsiloxane is used as an example, polystyrene as the sea-like polymer can be subjected to $O_2$ etching. Thus, if a carbon film is used as the transfer layer, the polymer and the transfer layer can be etched at one time by using only $O_2$. Accordingly, it is not necessary to exchange the process gas and the productive efficiency can be improved. In contrast, when the sea-like polymer is polydimethylsiloxane, etching can be performed similarly to the above case using $CF_4$ gas and using Si as the transfer layer. Thus, the pattern can be batch-transferred. As described above, the concave-convex pattern can be formed on the resist layer by using the microphase-separated pattern of the self-assembled film.

The concave-convex pattern can be formed using a metal fine particle material.

As described above, the metal fine particle dispersion is applied to the mask layer to form a single-layer particle film. Thereafter, etching is performed using the single-layer particle film as a mask so that the concave-convex pattern can be obtained.

When etching is performed, the etching gas and the etching conditions can be set in order to ensure the etching selectivity between the metal fine particle and the mask layer at the lower portion. As described above, when a polymer binder for improving the coating uniformity of the metal fine particles is added to the dispersion, it is recognized that an island-like metal fine particle pattern is dissolved in a sea-like binder. In this case, it suffices that the etching selectivity between the metal fine particles and the binder is ensured. It is possible to perform pattern processing using the metal fine particles as a mask.

The binder material is comprised of an organic compound and is soluble in the organic solvent contained in the metal fine particle dispersion. Various materials can be selected according to the kind of the solvent to be used. For example, materials such as polystyrene, polyethylene, polyvinyl pyrrolidone, and polymethylmethacrylate may be used.

When the interval between the metal fine particles is significantly narrow, the interval between the fine particles may be adjusted by intentionally etching the metal fine particles. Specific examples of the etching method include a method for increasing the side etch in dry etching and a method for adjusting the incidence angle of the ions in ion milling and slimming metal fine particles in the width direction. As described above, a concave-convex pattern can be formed on a resist layer using a metal fine particle mask.

The concave-convex pattern can be formed on the resist layer by nanoimprint lithography.

The nanoimprint is a process including pressing a nanoimprint stamper having a fine concave-convex pattern formed on its surface (hereafter referred to as "stamper") against a resist layer for transferring to transfer the pattern. In the process, a resist pattern can be batch-transferred to a large area of the sample as compared with techniques such as step and repeat mode of ultraviolet ray exposure and electron beam exposure. Therefore, the production throughput is increased, and thus it is possible to achieve a decrease in the production time and a reduction in cost.

The stamper can be obtained from a substrate comprising a fine concave-convex pattern formed by lithography, that is, a so-called master disc (a mold or a master). In many cases, the stamper is produced by subjecting the fine pattern of the master disc to electroforming. As the substrate for the master disc, a semiconductor substrate doped with impurities such as Si, $SiO_2$, SiC, SiOC, $Si3N_4$, C, B, Ga, In, and P may be used. Further, the shape of the substrate is not limited to the three-dimensional shapes, and it may be circular, rectangular or toroidal. Additionally, a substrate formed of a material having conductivity may be used.

The pattern of the master disc is formed by various lithography methods typified by electron beam exposure as described above. Here, the concave-convex pattern of the resist layer thus formed can be directly used as a pattern for electroforming. The concave-convex pattern is transferred to the master disc and then the resulting pattern may be used as the pattern for electroforming.

Subsequently, the concave-convex pattern of the master disc is subjected to electroforming to form a stamper. Examples of plated-metal include various materials. Here, as an example, a method for producing a stamper formed of Ni will be described. In order to first give the conductivity to the concave-convex pattern of the master disc, an Ni thin film is formed on the surface of the concave-convex pattern. In the electroforming process, if poor electric conduction is caused, the plating growth is inhibited, thereby leading to pattern defects. Accordingly, the Ni thin film may be uniformly formed on the surface of the concave-convex pattern and the side surface. In this regard, the film is formed to give the conductivity, and the material is not limited to Ni.

Subsequently, the master disc is immersed in a sulfamic-acid Ni bath and energized, followed by electroforming. The film thickness after plating, that is, the thickness of the stamper can be adjusted by changing the energizing current value and the plating time, in addition to the hydrogen ion concentration, temperature, and viscosity of the plating bath. The electroforming process can be performed by electrolytic plating or non-electrolytic plating.

A stamper thus obtained is released from the substrate. When the resist and the mask layer remain on the concave-convex surface of the stamper after peeling off, it suffices that residues of the resist layer are removed by etching on the concave-convex surface, resulting in exposure of the convex pattern. Finally, unnecessary portions other than the surface of the concave-convex pattern are mechanically removed, and the stamper is further processed into a desired shape such as a circular or rectangular shape, resulting in completion of the stamper.

The concave-convex pattern is transferred to the resist layer using the obtained stamper. In this case, the stamper is used as an alternative to the master disc so that a duplicated stamper can be produced. In this case, examples of the production method include a method for producing an Ni stamper from an Ni stamper, a method for producing a resin stamper from an Ni stamper or the like. Here, the method for producing a resin stamper will be described.

The resin stamper is produced by injection molding. First, the Ni stamper is loaded in an injection molding machine. A resin solution material is flowed onto the concave-convex pattern of the stamper, followed by injection molding. As the resin solution material, a cycloolefin polymer, polycarbonate, polymethylmethacrylate or the like may be used. Further, a material having good peel properties with respect to the imprint resist may be selected. After the injection molding, the sample is peeled off from the top of the Ni stamper to obtain a resin stamper having a concave-convex pattern.

The resin stamper is used to transfer the concave-convex pattern to the resist layer.

Resist materials such as heat-curing and photo-curing resins may be used for the resist. For example, isobornyl acrylate, allyl methacrylate, and dipropylene glycol diacrylate may be used.

These resist materials are applied to the sample having the magnetic recording layer and the mask layer to form a resist layer. Subsequently, a resin stamper having a concave-convex pattern is imprinted on the resist layer. If the resin stamper is pressed against the resist in the imprinting process, the resist is fluidized to form a concave-convex pattern. Here, if energies such as ultraviolet rays are applied to the resist layer to cure the resist layer having the concave-convex pattern thereon and then the resin stamper is released, the concave-convex pattern of the resist layer is obtained. In order to easily release the resin stamper, the surface of the resin stamper can be subjected to a releasing treatment using a silane coupling agent.

After the release of the resin stamper, the resist material remains as a residue in a recess portion of the resist layer. Thus, the surface of the mask layer is exposed by removing the material by etching. Since the polymer-based resist material has generally low etching resistance to the $O_2$ etchant, the residue can be easily removed by $O_2$ etching. When an inorganic material is included, the etchant may be appropriately changed in order to allow the resist pattern to remain. As described above, the concave-convex pattern can be formed on the resist layer by nanoimprinting.

Process of Patterning Mask Layer

Subsequently, the pattern is transferred to the mask layer.

In the processing of the mask layer, various layer configurations and processing methods can be achieved by the combination of the mask layer material and the etching gas.

When the fine processing is performed so that the etching in the thickness direction is more significant than the etching in the width direction of the concave-convex pattern, the dry etching can be used. Plasmas used for dry etching can be generated by various methods such as capacitive coupling, inductive coupling, electron cyclotron resonance, and multi-frequency superposition superposition coupling. In order to adjust the size of the concave-convex pattern, parameters such as the process gas pressure, the gas mass flow, the plasma power supply, the bias power, the substrate temperature, the chamber atmosphere, and the ultimate vacuum can be set.

When the mask material is stacked to increase the etching selectivity, the etching gas may be appropriately selected. Examples of the etching gas include fluorine-based gases, such as $CF_4$, $C_2F_6$, $C_3F_6$, $C_3F_8$, $C_5F_8$, $C_4F_8$, $ClF_3$, $CCl_3F_5$, $C_2ClF_5$, $CCBrF_3$, $CHF_3$, $NF_3$, and $CH_2F_2$; and chlorine-based gases, such as $Cl_2$, $BCl_3$, $CCl_4$, and $SiCl_4$. In addition, various gases, such as $H_2$, $N_2$, $O_2$, $Br_2$, HBr, $NH_3$, CO, $C_2H_4$, helium, Ne, Ar, Kr, and Xe may be used. In order to adjust the etching rate and the etching selectivity, a mixed gas obtained by mixing two or more of these gases may be used. The patterning may be performed by wet etching. In this case, it is possible to select an etching solution which can ensure the etching selectivity and control the etching in the width direction. Similarly, a physical etching process like ion milling may be performed.

Similarly to the second embodiment, it possible that the metal fine particle pattern is transferred to the mask layer, and then the metal fine particles are removed from the mask layer. The clogging at the groove portion of the pattern due to the sub-products produced by etching and the aggregation of the fine particles can be reduced by previously removing the metal fine particles.

The dry etching can be used for the removal of the metal fine particles. Alternatively, the wet etching using a peeling solution corresponding to the metal fine particle material may be used. As for the peeling solution, one in which the mask layer being exposed, the magnetic recording layer, and the substrate material are hardly soluble is selected.

Taking into consideration the etching selectivity between the mask layer and the metal fine particle layer, the mask layer may have various configurations. As described above, it may be configured to include C/Si, Ta/Al, Al/Ni, and Si/Cr in this order from the substrate side.

When the interval between the metal fine particles is significantly narrow, the interval between the fine particles may be adjusted by intentionally etching the metal fine particle film. Specific examples of the etching method include a method for increasing the side etch in dry etching and a method for adjusting the incidence angle of the ions in ion milling and slimming metal fine particles in the width direction. As described above, a concave-convex pattern can be formed on a resist layer using a metal fine particle mask.

A nanoimprint stamper is produced through the process of applying the metal fine particles and the process of transferring the pattern to the mask layer as shown in FIGS. 6A to 6H and FIGS. 7A to 7J. As shown in FIGS. 8A to 8M, the concave-convex pattern can be transferred to the magnetic recording layer by nanoimprint lithography.

Method for Producing Nanoimprint Stamper

The method for producing a stamper according to the embodiment includes: forming an island-like metal underlayer on a substrate; forming a phase-separated release layer on the substrate and the island-like metal underlayer; forming a resist layer on the phase-separated release layer; forming a concave-convex portion on the resist layer; covering the resist concave-convex pattern with a conductive layer; forming an electroformed layer using the conductive layer as an underlayer; dissolving and removing the phase-separated release layer and releasing the electroformed layer from the substrate; and removing the resist layer which the concave-convex portion of the electroformed layer is filled. Further, the method for forming a fine pattern using the method includes: forming a processed layer on a substrate; forming an island-like metal underlayer on the processed layer; forming a phase-separated release layer on the processed layer and the island-like metal underlayer; forming a mask layer on the phase-separated release layer; forming a transfer layer on the mask layer; forming a nanoimprint resist layer on the transfer layer; transferring a concave-convex pattern to the imprint resist layer using a stamper; transferring the concave-convex pattern to the transfer layer; transferring the concave-convex pattern to the mask layer, transferring the concave-convex pattern to the phase-separated release layer; transferring the concave-convex pattern to the processed layer; and dissolving and removing the phase-separated release layer and removing the mask layer from the processed layer to expose the concave-convex pattern of the processed layer.

Here, when the stamper is physically released from the substrate like the conventional method, the stamper shape was deformed due to the physical stress to it, which causes impairment of the surface smoothness of the stamper. This leads to transfer unevenness of the concave-convex pattern in nanoimprinting as described below and further leads to great deterioration of pattern transfer properties to the resist layer. When the release layer is formed on the substrate like the conventional method, the peel properties of the release layer are deteriorated due to diffusion of the metal material at the interface with the electroformed layer on the release layer. This case necessitates physically peeling off the layer from the substrate.

The stamper is released from the substrate by forming the phase-separated release layer shown in the embodiment between the substrate and the resist layer on the substrate and dissolving the phase-separated release layer using a peeling liquid after electroforming. Since the phase-separated release layer has a fast dissolution rate, it can be well dissolved even in a thin film state having good surface smoothness and can be lifted-off without using a strong acid and a strong base like the conventional method. Thus, the peeling liquid causes little damage on the stamper. Consequently, the stamper can be released from the substrate without any deformation due to the physical stress and thus it is possible to produce a stamper excellent in surface smoothness.

The nanoimprint lithography is a process including pressing a nanoimprint stamper having a fine concave-convex pattern formed on its surface (hereafter referred to as "stamper") against a resist layer for transferring to transfer the pattern. In the process, a resist pattern can be batch-transferred to a large area of the sample as compared with techniques such as step and repeat mode of ultraviolet ray exposure and electron beam exposure. Therefore, the production throughput is increased, and thus it is possible to achieve a decrease in the production time and a reduction in cost.

The stamper can be obtained from a substrate comprising a fine concave-convex pattern, that is, a so-called master disc (a mold or a master). In many cases, the stamper is produced by subjecting the fine pattern of the master disc to electroforming. As the substrate for the master disc, a semiconductor substrate doped with impurities such as Si, $SiO_2$, SiC, SiOC, $Si_3N_4$, C, B, Ga, In, and P may be used. Additionally, a substrate formed of a material having conductivity may be used. Further, the shape of the substrate is not limited to the three-dimensional shapes, and it may be circular, rectangular or toroidal.

As for the pattern of the master disc, the metal fine particles may be used as the concave-convex pattern as described above. The pattern obtained by transferring the metal fine particle pattern to the mask layer may be used as a pattern for electroforming. Further, the concave-convex pattern is transferred to the master disc and the resulting pattern may be used as the pattern for electroforming as shown in FIG. 6D.

Subsequently, for example, as shown in FIG. 6F, the concave-convex pattern of the master disc is subjected to electroforming to form a stamper. Examples of electroformed, that is, plated-metal include various materials. Here, as an example, a method for producing a stamper formed of Ni will be described.

In order to give the conductivity to the concave-convex pattern of the master disc, a conductive film is formed on the surface of the metal fine particle film having a single layer structure. In the electroforming process as described below, if poor electric conduction is caused, the plating growth is inhibited, thereby leading to pattern defects. Accordingly, the conductive film is uniformly formed on the surface of the concave-convex pattern and the side surface. However, when a conductive material is used for the metal fine particles and the substrate, it is not limited thereto. The concave-convex pattern may have electrical continuity. In this case, the conductive film can be formed on the top portion and side surface of a metal fine particle and gaps between the particles.

The conductive film may be selected from various materials. Examples of the materials of the conductive film include such as Ni, Al, Ti, C, Au, and Ag. Here, examples using Ni will be explained.

The conductive film formed on the metal fine particle may be integrated with the metal fine particle pattern.

Subsequently, the master disc is immersed in a sulfamic-acid Ni or NiP bath and energized, followed by electroforming to form an electroformed layer as a stamper on the conductive film. The film thickness after plating, that is, the thickness of the stamper can be adjusted by changing the energizing current value and the plating time, in addition to the hydrogen ion concentration, temperature, and viscosity of the plating bath. The electroforming process can be performed by electrolytic plating or non-electrolytic plating.

A stamper thus obtained is released from the substrate as shown in the drawing. When the resist and the mask layer remain on the surface of the concave-convex pattern of the stamper, the metal fine particles remained as residues are removed by etching on the surface of the concave-convex pattern, resulting in exposure of the concave-convex pattern. Alternatively, a process of selecting a peeling liquid which is hardly-soluble against the stamper and readily-soluble against the resist and the mask layer and wet-etching using the liquid may be performed. Finally, unnecessary portions other than the surface of the concave-convex pattern are mechanically removed, and the stamper is further processed into a desired shape such as a circular or rectangular shape, resulting in completion of the stamper.

FIGS. 7A to 7J show a modification of the production process of the nanoimprint stamper in FIGS. 6A to 6H. This embodiment is almost the same as the production process of the stamper shown in FIGS. 6A to 6H except that the mask layer is formed on the substrate. As described above, the material of the mask layer used herein may be any material as long as it can ensure the etching selectivity between the material and the metal fine particles. The mask layer may have a two or more multilayer structure. Further, it is also possible to produce a stamper by transferring the concave-convex pattern to the substrate through the mask layer and using the master disc having the substrate (not shown) to which the concave-convex pattern is transferred.

The stamper is used as an alternative to the master disc so that a duplicated stamper can be produced. In this case, examples of the production method include a method for producing an Ni stamper from an Ni stamper, a method for producing a resin stamper from an Ni stamper or the like. Here, a method for producing a resin stamper which is relatively cost-effective and easy to produce will be described.

The resin stamper is produced by injection molding. First, the Ni stamper is loaded in an injection molding machine. A resin solution material is flowed onto the concave-convex pattern of the stamper, followed by injection molding. As the resin solution material, a cycloolefin polymer, polycarbonate, polymethylmethacrylate or the like may be used. Further, a material having good peel properties with respect to the imprint resist as described below may be selected. After the injection molding, the sample is peeled off from the top of the Ni stamper to obtain a resin stamper having a concave-convex pattern.

FIGS. 8A to 8M show an example of producing a concave-convex pattern using a resin stamper and transferring it.

The obtained resin stamper is used to transfer the concave-convex pattern. As described above, a sample in which the magnetic recording layer and the mask layer are formed in this order from the substrate side is used and further the imprint resist layer is formed on the mask layer. The resultant product is used as the sample. Various resist materials such as heat-curing and photo-curing resins may be used for the imprint resist. For example, isobornyl acrylate, allyl methacrylate, and dipropylene glycol diacrylate may be used.

These resist materials are applied to the sample having the magnetic recording layer and the mask layer on the substrate to form a resist layer. Subsequently, a resin stamper having a concave-convex pattern is imprinted on the resist layer. If the resin stamper is pressed against the resist in the imprinting process, the resist is fluidized to form a concave-convex pattern. Here, if energies such as ultraviolet rays are applied to the resist layer to cure the resist layer having the concave-convex pattern thereon and then the resin stamper is released, the concave-convex pattern of the resist layer is obtained. In order to easily release the resin stamper, the surface of the resin stamper may be subjected to a releasing treatment using a silane coupling agent.

Subsequently, the resin stamper to which an imprint resist is pressed is released. After the release of the resin stamper, the resist material remains as a residue in a recess portion of the resist layer. Thus, the surface of the mask layer is exposed by removing the material by etching. Since the polymer-based resist material has generally low etching resistance to the $O_2$ etchant, the residue can be easily removed by dry etching using an $O_2$ gas. When an inorganic material is included, the etching gas can be appropriately changed in order to allow the resist pattern to remain. The concave-convex pattern is transferred to the mask layer and the magnetic recording layer, and then a magnetic recording medium having a concave-convex pattern can be produced by nanoimprint lithography through the process of forming the protective film.

Process of Patterning Magnetic Recording Layer

Subsequently, the concave-convex pattern is transferred to the magnetic recording layer at the lower portion of an alloy release layer.

Examples of a typical method for forming isolated magnetic dots include the reactive ion etching and milling methods. Specifically, the patterning can be performed by the reactive ion etching method using CO or $NH_3$ as an etching gas or by the ion milling method using an inert gas such as He, Ne, Ar, Xe or Kr.

In the process of patterning the magnetic recording layer, a relation between the etching rate of the mask layer (ERmask) and the etching rate of the magnetic recording layer (ERmag) satisfies a relation: ERmask≤ERmag. That is, in order to obtain a desired thickness of the magnetic recording layer, the regression of the mask layer caused by etching can be reduced.

When the concave-convex is transferred to the magnetic recording layer by ion milling, it is possible to reduce by-products scattering to the mask side surface (so-called redeposition components). The redeposition components are adhered to the periphery of the convex pattern mask, and thus the size of the convex pattern is expanded and the groove portion is buried. Accordingly, in order to obtain a divided magnetic recording layer pattern, the redeposition components are reduced as much as possible. If the deposition components generated at the time of etching of the magnetic recording layer at the lower portion of the release layer cover the side surface of the release layer, the release layer is not exposed to the peeling solution. As a result, the peel properties are deteriorated. Consequently, after all, the redeposition components can be reduced.

When the magnetic recording layer is subjected to the ion milling method, the redeposition components scattering to the side surface can be reduced by changing the incidence angle of ions. In this case, although an optimal incidence angle varies depending on the mask height, the redeposition components can be reduced by changing the angle in a range of 20° to 70°. The incidence angle of ions can be appropriately changed during milling. For example, a method including milling processing a magnetic recording layer at an ion incident angle of 0°, changing the ion incident angle, and selectively removing the redeposition part of the convex pattern is used.

Process of Removing and Peeling Off Mask Layer

Subsequently, the mask pattern on the magnetic recording layer is removed to obtain a magnetic recording layer having a concave-convex pattern.

When peeling is performed by dry etching, chemical reformulation of the surface of the magnetic recording layer can be reduced. Further, etching can be performed so as not to reduce the thickness of the magnetic recording layer.

When the release layer is dissolved by wet etching, it is possible to allow the solubility rate for the magnetic recording layer and the substrate to be lower than that for the release layer.

When the dry etching is chemically performed using an active gas, the surface is exposed to an activated gas in order to be reformed again. This achieves improvement in the peel properties. For example, when the surface of the release layer is oxidized due to excessive exposure to oxygen plasma, the reduction reaction is facilitated by re-exposure to hydrogen plasma. Thus, the peel properties of the release layer can be maintained. The side surface of the release layer can be reformed by washing with a solution. For example, a fluorine compound is removed by washing the fluorine compound attached to the side surface of the release layer with water after exposure to fluorine plasma so that the surface of the release layer can be cleaned.

Further, an unprocessed layer, that is, the release layer formed on the magnetic recording layer is removed so that the mask layer can be peeled off from the magnetic recording layer. In this case, the layer can be peeled by wet etching in addition to dry etching. As described above, the net density of soluble metal in the phase-separated release layer is lower than that of the conventional single metal release layer or alloy release layer. Further, the releasing rate is faster due to the diffusion of the metal material into the matrix. Therefore, even in the case of a thin film, it is possible to leave little residues during peeling. Additionally, it is possible to perform peeling using a low concentration of the peeling liquid. Thus, the damage on the surrounding pattern at the time of dissolving can be reduced. Particularly, magnetic properties of the magnetic recording layer to be in contact with the peeling liquid are deteriorated by corrosion due to an acid or alkali on the surface. Thus, a low concentration of the peeling liquid can be used. The range of the concentration changes depending on each peeling liquid and the concentration can be set to a range of 0.01 wt % to 1 wt %. If the concentration is within the range, it is possible to achieve excellent peel properties and low damage. Further, the effects of the surface smoothness and processability improved by the patterning process allow a concave-convex pattern with small variation in size to be formed. When the layer is peeled by wet etching, various methods can be used. It can be selected from methods such as a dipping method, a paddling method, a spinning method, a spraying method, and a solvent exposure method.

Process of Forming Protective Layer

Finally, a carbon-based protective layer and the fluorine-based lubricating film (not shown) are formed on the magnetic recording layer having a concave-convex pattern so that a magnetic recording medium having the concave-convex pattern can be obtained.

A DLC film containing a large amount of $sp^3$-bonded carbon can be used for the carbon protective layer. The film thickness may be set to 2 nm or more in order to maintain coatability. The film thickness may be set to 10 nm or less in order to maintain the S/N signal. Usable examples of lubricants include perfluoropolyether, fluoroalcohol, and fluorinated carboxylic acid.

Figure 15:
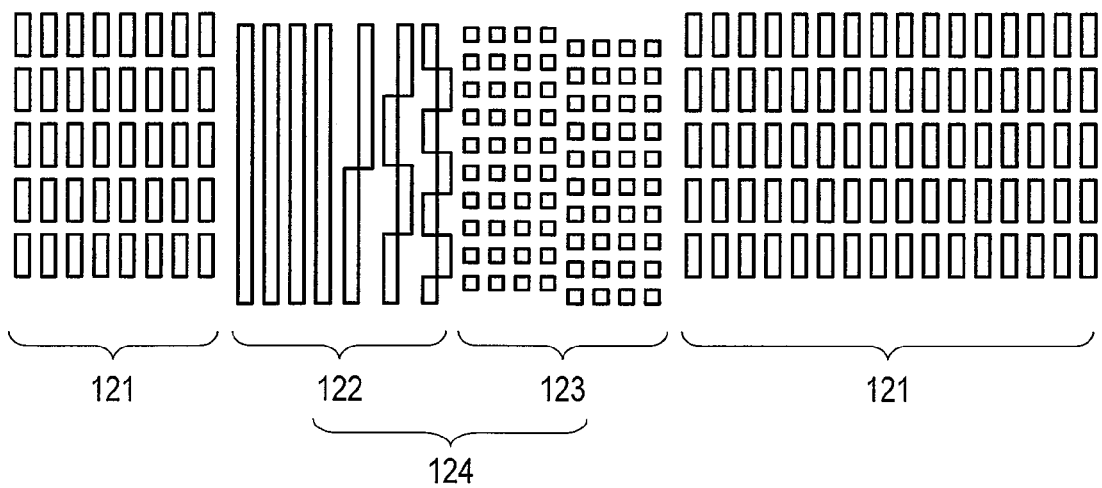
FIG. 15 is a view showing an example of a record bit pattern in a circumferential direction of a magnetic recording medium.

FIG. 15 shows a view showing an example of a record bit pattern in a circumferential direction of a magnetic recording medium.

As shown the drawing, the convex pattern of the magnetic recording layer is classified roughly into so-called servo areas 124: a record bit area 121 which records the data corresponding to digital signals "1" and "0"; a preamble address pattern 122 which is a signal to determine the location of a magnetic recording head; and a burst pattern 123. This pattern can be formed as an in-plane pattern. The shown pattern of the servo area may be a rectangular shape. For example, all the servo patterns may be replaced with dot shapes.

Figure 16:
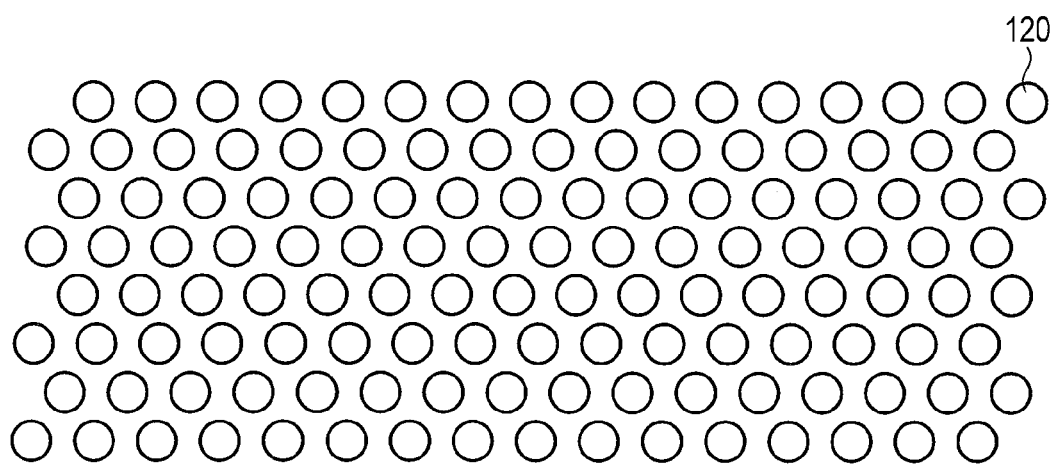
FIG. 16 is a view showing another example of a record bit pattern in a circumferential direction of a magnetic recording medium.

Like FIG. 16, the servo and the data area may be formed of dot patterns 120. 1-bit information may be configured to have a magnetic dot or a plurality of magnetic dots.

FIG. 17 is a partially disassembled perspective view of a magnetic recording/reproducing device to which the magnetic recording medium according to the embodiments can be applied.

The same drawing shows the internal structure in which the top cover of the hard disk drive according to the embodiment is detached as a disk device. As shown in the drawing, the HDD comprises a case 210. The case 210 comprises a rectangular box-shaped base 211 having an open upper surface and a rectangular plate-shaped top cover (not shown). The top cover is screwed to the base 211 with a plurality of screws and thereby closes the top opening of the base 211. As a result, the inside of the case 210 is kept air-tight and can exchange air with the outside only through a breathing filter 226.

A magnetic disk 212 (recording medium) and a driving unit are provided on the base 211. The driving unit comprises a spindle motor 213 which supports and rotates the magnetic disk 212, a plurality of (e.g., two) magnetic heads 233 which record and reproduce information on and from the magnetic disk 212, a head actuator 214 which supports the magnetic heads 233 in such a manner that they are movable with respect to the surfaces of the magnetic disk 212, and a voice coil motor (hereinafter referred to as "VCM") 216 which rotates and positions the head actuator 214. A lamp loading mechanism 218 which holds, at a position that is spaced from the magnetic disk 212, the magnetic heads 233 when they have been moved to the outermost periphery of the magnetic disk 212, an inertia latch 220 which holds the head actuator 214 at an escape position when the HDD has received impact or the like, and a board unit 217 which is mounted with electronic components such as a preamplifier and a head IC are also provided on the base 211.

A control circuit board 225 is screwed to the external surface of the base 211 in order to be opposed to the bottom wall of the base 211. The control circuit board 225 controls operations of the spindle motor 213, the VCM 216, and the magnetic heads 233 via the board unit 217.

In FIG. 13, the magnetic disk 212 is configured as the perpendicular magnetic recording medium having the convex pattern formed by the above processing method. The magnetic disk 212 has, for example, a substrate 219 which is formed into a disc shape having a diameter of about 2.5 inch and is comprised of a nonmagnetic material. A soft magnetic layer 223 as an underlayer is formed on each surface of the substrate 219 and a perpendicular magnetic recording layer 222 having magnetic anisotropy in a perpendicular direction to the disc surface is formed on the soft magnetic layer 223. Further, a protective film 224 is formed thereon.

The magnetic disk 212 is fitted with the hub of the spindle motor 213 concentrically, and is clamped by a clamp spring 221 screwed to the top end of the hub and is thereby fixed to the hub. The magnetic disk 212 is rotationally driven by the spindle motor 213 (drive motor) in the direction indicated by an arrow B at a predetermined speed.

The head actuator 214 comprises a bearing unit 215 which is fixed to the bottom wall of the base 211 and a plurality of arms 227 which extend from the bearing unit 215. The arms 227 are spaced from each other by a predetermined interval and extend in the same direction from the bearing unit 215 parallel with the surfaces of the magnetic disk 212. The head actuator 214 comprises suspensions 230 each of which is elastically deformable and is shaped like a long and narrow plate. Each suspension 30, which is a leaf spring, extends from the corresponding arm 227 with its base end portion spot-welded or bonded to the tip portion of the arm 227. A magnetic head 233 is supported by the extending end of each suspension 230 through a gimbal spring 241. Each suspension 230, the gimbal spring 241, and the magnetic head 233 constitutes a head gimbal assembly. The head actuator 214 may have a configuration comprising a so-called E block in which a sleeve of the bearing unit 215 is integrated with the arms.

EXAMPLES

Hereinafter, examples will be shown, and the embodiments will be specifically described.

Example 1

Electron-Beam Lithography

Examples 1 to 4 are examples when the first metal consisting the phase-separated release layer was Mo, the second metal was W, the oxide was $SiO_2$, and the composition ratios thereof were 40 atomic %, 40 atomic %, and 20 atomic %, respectively. The following 4 examples show the results when the materials of the phase-separated release layer was not changed and the method for forming the concave-convex pattern on the resist layer was changed.

First, a method comprising: forming a concave-convex pattern on a resist layer by electron-beam lithography and transferring the pattern to a magnetic recording layer will be described.

A 2.5 inch-diameter doughnut-shaped substrate was used as the substrate. The magnetic recording layer was formed on the substrate by the DC sputtering method. Ar was used as the process gas, the gas pressure was set to 0.7 Pa, the gas mass flow was set to 35 sccm, and the power supply was set to 500 W. A 10-nm-thick NiTa underlayer, a 4-nm-thick Pd underlayer, a 20-nm-thick Ru underlayer, and a 5-nm-thick CoPt recording layer were sequentially formed from the substrate side. Finally, a 3-nm-thick Pd protective layer was formed to obtain a magnetic recording layer.

Subsequently, an island-like seed layer was formed on the magnetic recording layer in order to achieve excellent phase separation of the release layer. Mo was used as the material of the seed layer and a 1.5-nm-thick island-like seed layer was formed by spattering for 7 seconds under the conditions of Ar gas pressure of 4.0 Pa and power supply of 300 W. Thereafter, an $MoWSiO_2$ phase-separated release layer was formed by reactive sputtering in a chamber including a ternary material comprised of Mo, W, and $SiO_2$. The thickness of the release layer was set to 3 nm. The obtained release layer was measured with a transmission electron microscope (TEM), and a phase separation form of an island-like cylinder pattern and a sea-like matrix pattern was observed in the film. Further, the cross-section was observed in detail, and it was confirmed that the island-like cylinder pattern was oriented in the direction perpendicular to the surface of the substrate. Further, the composition was identified by energy dispersive X ray analysis (EDX), and it was confirmed that a phase-separated pattern including an island-like cylinder pattern of MoW whose surrounding was filled with an $SiO_2$ matrix pattern was formed.

At this time, the surface roughness of the release layer was measured using an atomic force microscope (AFM). It was found that surface roughness was small (about 0.282 nm). In order measure the dissolution rate to the peeling liquid and the milling rate to ion milling, an $MoWSiO_2$ granular release layer having a thickness of 50 nm was formed on the glass substrate and the rates were measured. First, hydrogen peroxide water was diluted with H2O to prepare a solution having a concentration of 0.5 wt %, and the resulting solution was used as a peeling liquid. Further, the granular release layer was immersed in the peeling liquid and the dissolution rate was measured. As a result, it was found that the dissolution rate was fast (1.14 nm). When measuring the ion milling rate, a sample was loaded into a face-type ion milling system, the accelerating voltage was set to 300 V, the gas pressure was set to 0.1 Pa, and the ion milling rate was measured. As a result, it was found that the milling rate was high (0.152 nm/sec). When the granular release layer is used, the surface smoothness of the uppermost surface of the film is excellent compared with the conventional single metal film and alloy film. Additionally, it is confirmed that it is possible to achieve improvements in the dissolution rate and the milling rate accompanying filling with $SiO_2$. That is, according to the example, all the three (surface smoothness, solubility, and processability) can be improved.

Then, the mask layer was formed on the release layer. Here, in order to transfer the concave-convex pattern of the resist layer with high resolution, a two-layered mask was used. As the first mask layer, a 30-nm-thick C film was formed from the substrate side. Further, as the transfer layer at the upper portion, a 5-nm-thick Si film was used. Each mask layer was formed by spattering using a facing-targets sputtering system under the conditions of Ar gas flow rate of 35 sccm, Ar gas pressure of 0.7 Pa, and power supply of 500 W.

Then, a principal chain breaking-type electron beam positive resist for patterning was formed. As the electron beam resist, ZEP-520A (ZEON CORPORATION) was used. The resist was diluted in anisole as the solvent at a weight ratio of 1:3 (ZEP-520A: anisole) to prepare a diluted solution. Thereafter, the diluted solution was dropped onto the substrate. The substrate was spin-coated at a rotating speed of 2500 rpm. The sample was maintained on a vacuum hot plate heated to 180° C. for 150 seconds, and the electron beam resist was cured to have a thickness of 20 nm by prebaking.

Then, a pattern was drawn on the electron beam resist using an electron beam lithography system having a ZrO thermal field-emission electron source and beams with an accelerating voltage of 100 kV and a beam diameter of 2 nm. The electron beam lithography system is a so-called x-θ type lithographic system provided with signals used to form a writing pattern and with a one-way moving mechanism and rotating mechanism of a sample stage. In the drawing on the sample, the signals used to polarize electron beams are synchronized and the stage is moved in a radial direction. Here, a latent image of a dot/space pattern and line/space pattern at a pitch of 20 nm was formed on the electron beam resist under the conditions: drawing linear velocity: 0.15 m/sec, beam current value: 13 nA, and feed per revolution in the radial direction: 5 nm.

Development of the mask layer allows a convex pattern (10 nm-diameter dot and 10 nm-space, 10 nm-width line and 10 nm-width space) to be resolved. As the developer, an organic developer containing 100% normal amyl acetate as a component as was used. The electron beam resist was developed by immersing the sample in the solution for 20 seconds.

Then, the sample was rinsed by immersing the sample in isopropyl alcohol for 20 seconds. The surface of the sample was dried by directly blowing N2.

The process of transferring the concave-convex pattern to the mask layer was performed by dry etching. In the dry etching, the inductively-coupled plasma etching with $CF_4$ gas and $O_2$ gas was used. In order to transfer the concave-convex pattern to the Si transfer layer at the lower resist portion, the resist concave-convex pattern was transferred by etching under the conditions of $CF_4$ gas pressure of 0.1 Pa, gas mass flow of 20 sccm, power supply of 100 W, and bias power of 10 W for 40 seconds. Subsequently, $O_2$ gas was used to etch the C mask layer. The concave-convex pattern was transferred by etching under the conditions of gas pressure of 0.1 Pa, gas mass flow of 20 sccm, power supply of 100 W, and bias power of 20 W for 65 seconds.

Next, the concave-convex pattern was transferred to the release layer and the magnetic recording layer. As described above, in the process of transferring the concave-convex pattern to the release layer and the magnetic recording layer, the layers may be separately patterned through different etching processes or the same process. Here, an Ar ion milling method was used. The milling was performed under the conditions of Ar ion acceleration voltage of 300 V, gas mass flow of 3 sccm, process pressure of 0.1 Pa, and incident angle of ions on the surface of the substrate of 90° (perpendicular incidence) for 85 seconds to transfer the concave-convex pattern to a 5-nm-thick $MoWSiO_2$ alloy release layer and a 5-nm-thick CoPt recording layer.

Subsequently, the mask pattern was removed by wet releasing. As described above, $MoWSiO_2$ highly soluble in an acid is used herein, and thus it is possible to dissolve and remove the release layer even when the concentration in solution is low. Further, the use of a low concentration solution allows the elution of the magnetic recording layer to the acid peeling liquid to be reduced. Thus, damage on the recording layer due to peeling can be reduced. Here, an example where wet releasing was performed using hydrogen peroxide water as the acid peeling liquid will be shown. The hydrogen peroxide water was prepared to have a concentration of 0.5 wt %. As a result, the elution of the CoPt magnetic layer by contact with the peeling liquid is hardly caused. It is possible to realize little damage and high surface smoothness. The sample was immersed in the prepared hydrogen peroxide water for 3 minutes. Subsequently, the sample was washed with pure water for 5 minutes to clean up the surface of the medium. As a result, the mask layer was removed from the top of the magnetic recording layer.

Finally, a 2-nm-thick DLC film was formed. Thereafter, a perfluoro polyether-based lubricating film was formed in order to have a thickness of 1.5 nm and a magnetic recording medium having a concave-convex pattern was obtained.

The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 2

Self-Assembly Lithography

Example 2 was performed similarly to Example 1 except that, as a resist layer, a self-assembled film was used in place of ZEP-520A to form a microphase-separated structure, etching based on the microphase-separated pattern was performed, and a carbon film was further inserted between the self-assembled film and a mask layer to allow the transfer of the pattern of the self-assembled film and the mask layer to be excellent.

First, a carbon film for transferring the self-assembled pattern was formed in order to have a thickness of 3 nm on an Si transfer layer. Here, the film formation was performed by the DC sputtering method under the conditions of Ar gas pressure of 0.7 Pa and power supply of 500 W.

Subsequently, a block copolymer solution was applied onto a carbon film. As the block copolymer solution, a solution prepared by dissolving a block copolymer of polystyrene and polydimethylsiloxane in a coating solvent was used. The molecular weights of polystyrene and polydimethylsiloxane are 11700 and 2900, respectively. A microphase-separated structure having a pattern pitch of 20 nm is obtained from this composition. Propylene glycol monomethyl ether acetate was used as the solvent to prepare a polymer solution having a percentage by weight concentration of 1.5%.

The solution was dripped onto a carbon film mask. The spin coating was performed at a rotating speed of 5000 rpm and a self-assembled film was formed using a single self-assembled film having a thickness of 18 nm. The single self-assembled film does not have a layered structure on the same flat surface of the medium, and means that the microphase-separated pattern of the sea-like polystyrene and the island-like polydimethylsiloxane is single-layered.

Further, the sea-like polystyrene and the island-like polydimethylsiloxane dot pattern are microphase-separated in the self-assembled film and thus thermal annealing was performed. In the thermal annealing, annealing was performed at 170° C. for 12 hours (in a reduced pressure atmosphere, furnace pressure: 0.2 Pa) using a vacuum furnace to form a microphase-separated structure having a pitch dot of 20 nm in the self-assembled film.

Then, etching was performed using the phase-separated pattern as a base pattern to form a concave-convex pattern. The etching was performed by inductively coupled plasma reactive ion etching. The process gas pressure was set to 0.1 Pa, and the gas mass flow was set to 5 sccm.

In order to remove polydimethylsiloxane of the surface layer of the self-assembled film, etching using $CF_4$ gas as an etchant was performed under the conditions of antenna power of 50 W and bias power of 5 W for 7 seconds. Subsequently, in order to transfer the concave-convex pattern to the sea-like polystyrene and the C film of the lower portion of the self-assembled film, etching using $O_2$ gas as an etchant was performed under conditions of antenna power of 100 W and bias power of 5 W for 110 seconds. Since the $O_2$ etchant used for the removal of polystyrene etches the C film at the lower portion, the Si transfer layer becomes a stopper layer to stop the etching. Similarly to Example 1, etching was performed on the Si transfer layer at the lower portion and the C mask layer by plasma etching using the $CF_4$ etchant and the $O_2$ etchant to transfer the concave-convex pattern of the self-assembled film to the mask layer.

Hereafter, a magnetic recording medium having a concave-convex pattern was obtained by transferring the pattern and performing the peeling process, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 3

Metal Fine Particle Mask

Example 3 was performed similarly to Example 2 except that a layer comprised of metal fine particles and a polymer binder was used as a resist layer and a concave-convex pattern was formed using metal fine particles as a resist concave-convex pattern.

First, a coating solution for forming the metal fine particle mask was produced. As the coating solution, one prepared from a mixture of a dispersion of metal fine particles and a high polymer binder was used.

As the metal fine particles, Au particles having an average particle diameter of 20 nm were used. Further, toluene was used as a solvent of the dispersion and the solution was prepared to have a concentration of 3 wt %. In order to suppress formation of secondary particles which is caused by the aggregation of the Au fine particles, the monodispersion of the Au particles was facilitated by adding a dispersant containing polycarboxylic acid amine salt to the dispersion at a concentration of 0.001 wt %.

Subsequently, a polystyrene polymer binder was added to the Au dispersion to prepare a coating solution. As a result of mixing with the dispersant, the polymer binder plays a role in improving coating properties of the metal fine particle solution. Further, a mixing system comprised of the metal fine particles and the polymer binder shows a mode similar to the microphase-separated pattern of the self-assembled film in Example 2. Specifically, the polymer binder corresponds to the sea-like polystyrene and the metal fine particles correspond to the island-like polydimethylsiloxane dot.

Subsequently, a metal particulate resist layer was formed on a C film. An appropriate amount of the produced metal fine particle coating solution was dropped onto the C film, followed by spin coating at a rotating speed of 3000 rpm to form a single-layer of the metal fine particle layer on the substrate. The term "single-layer" is synonymous with that used in the description of the self-assembled film. It does not have a layered structure on the same flat surface of the medium and means that a composite layer of the sea-like polymer binder and the island-like Au metal fine particles is single-layered. After coating, the layer was baked in an oven in $N_2$ atmosphere at 150° C. for 30 minutes to cure the polymer binder and a metal fine particle mask layer was formed.

Dry etching was performed on the mask layer to form a concave-convex pattern. In this example, the polymer binder with which the gaps between the metal fine particles were filled were removed to use the metal fine particle as a mask. In dry etching, etching was performed using $O_2$ gas as an etchant under the conditions of process gas pressure of 0.1 Pa, gas mass flow of 5 sccm, antenna power of 100 W, and bias power of 10 W for 24 seconds to transfer the concave-convex pattern to the polymer binder and the carbon film at the lower portion.

Hereafter, a magnetic recording medium having a concave-convex pattern was obtained by transferring the pattern from the Si transfer layer to the magnetic recording layer and performing the peeling process, similarly to Example 2. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 4

Nanoimprinting

Example 4 was performed similarly to Example 1 except that a nanoimprint resist was used as a resist layer and a nanoimprint stamper was used to form a concave-convex pattern.

In order to produce a nanoimprint stamper, a master disc was produced. It is possible to produce a stamper with very little distortion after the release by using the $MoWSiO_2$ for the master disc. Hereafter, a master disc for producing a nanoimprint stamper using a phase-separated release layer, a nanoimprint stamper produced using the disc, and a method for producing a magnetic recording medium using the stamper will be described.

A general-purpose-6-inch Si wafer was used as the substrate. A phase-separated release layer having a thickness of 5 nm was formed on the wafer similarly to Example 1. The phase-separated layer is dissolved and removed after producing the nanoimprint stamper by electroforming so that the layer plays a role in releasing the stamper from the substrate.

Here, a resist layer having a thickness of 20 nm was formed on the phase-separated release layer, similarly to Example 1. Hereafter, a 20-nm-pitch dot pattern was produced by performing electron beam exposure and development on the resist layer, similarly to Example 1. In order to subject the concave-convex pattern thus obtained to electroforming, a conductive treatment is performed on the concave-convex pattern. Thus, an Ni film was formed herein by the DC sputtering method. The concave-convex pattern was uniformly coated with an Ni conductive film having a thickness of 5 nm under the conditions of ultimate vacuum of $8.0 \times 10^{-4}$ Pa, Ar gas pressure of 1.0 Pa, and DC power supply of 200 W. In place of the Ni film, it is possible to use Ni—P and Ni—B alloys formed by vacuum deposition or electroless plating, in addition to the sputtering method as the method for forming the conductive film. In order to easily peel the stamper, the surface may be oxidized after the formation of the conductive film.

Subsequently, an Ni film is formed along with the concave-convex pattern by electroforming. A highly concentrated nickel sulfamate plating solution (NS-169, manufactured by Showa chemical Co., Ltd.) was used for an electroforming solution. Under electroforming conditions: nickel sulfamate: 600 g/L, boric acid: 40 g/L, sodium lauryl sulfate surfactant: 0.15 g/L, solution temperature: 55° C., pH: 3.8 to 4.0, and energized current density: 20 A/dm$^2$, an Ni stamper having a thickness of 300 µm was produced.

A nanoimprint stamper having a concave-convex pattern can be obtained by demolding the Ni stamper from the master disc. However, when releasing the stamper from the substrate, the Ni film has a distortion, and unevenness occurs in the surface of the concave-convex pattern after nanoimprinting.

On the other hand, the nanoimprint stamper which is released from the substrate by dissolving and removing the phase-separated release layer has no distortion due to physical release. Thus, the stamper is excellent in surface smoothness and it is possible to reduce the variation in size of the concave-convex pattern in the surface after transfer of the pattern.

Here, hydrogen peroxide water adjusted to a concentration of 0.5 wt % was used as the peeling solution. The stamper and the substrate which were bonded by electroforming were immersed in the peeling solution to dissolve the phase-separated release layer between the stamper and the substrate, followed by lift-off based releasing. The stamper was easily released from the substrate in the peeling solution and no physical distortion occurred. Thus, the surface smoothness was not deteriorated. Since the concave portion of the stamper after releasing was filled with the resist material released from the master disc, oxygen ashing was performed to remove the material from the top of the stamper. In the ashing process, an asher with a barrel type chamber was used. Ashing was performed under the conditions of oxygen flow rate of 20 sccm and power supply of 200 W for 30 seconds to remove the resist material from the concave portion. Although the method will not be described in this example, the resist material can be removed by wet-removal using an organic solvent, an acid or the like. As described above, the phase-separated release layer was used for the master disc to produce a nanoimprint stamper with little distortion. When residues and particles remain on the stamper thus produced, the residues can be removed by etching the concave-convex pattern, if necessary. Thus, the stamper can be cleaned. Finally, the electroformed Ni plate was punched into a disk shape having a diameter of 2.5 inch and processed to obtain an Ni stamper for nanoimprinting.

The Ni stamper was subjected to an injection molding treatment and the resin stamper was duplicated. A cyclic olefin polymer (manufactured by ZEON CORPORATION (ZEONOR 1060R)) was used for the resin material.

A concave-convex pattern was formed on a resist layer using the resin stamper thus obtained. First, an ultraviolet cured resist was spin-coated on a medium sample to have a thickness of 40 nm and the resulting layer was used as the resist layer. Subsequently, the resin stamper was imprinted on the resist layer, and the resist layer was cured by irradiating with ultraviolet rays (irradiating with ultraviolet rays in a state where the ultraviolet cured resin layer was pressed by the resin stamper). The resin stamper was released from the cured resist layer to obtain a desired 20-nm-pitch dot pattern.

The resist residues accompanied by imprinting were present in the groove portion of the concave-convex pattern of the sample, and thus they were removed by etching. The removal of the resist residues was performed by the plasma etching with $O_2$ etchant. The resist residues were removed by etching under the conditions of $O_2$ mass flow of 5 sccm, pressure of 0.1 Pa, power supply of 100 W, and bias power of 10 W for 80 seconds.

Hereafter, a magnetic recording medium having a concave-convex pattern was produced by transferring the concave-convex pattern from the Si transfer layer to the magnetic recording layer and peeling off the phase-separated release layer in a solution, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 5

Examples 5 to 11 are examples showing the results when the metal materials consisting of the phase-separated release layer were Mo and W and the oxide was $SiO_2$ and the composition of each of the materials was changed.

This example was performed similarly to Example 1 except that 50 atomic % of Mo, 45 atomic % of W, and 5 atomic % of $SiO_2$ were used. A phase-separated release layer of $MoWSiO_2$ was formed by reactive sputtering similarly to Example 1 and the thickness was set to 3 nm.

The average surface roughness of the release layer was measured with the AFM similarly to Example 1, and it exhibited a very small value of 0.298 nm. Further, it was confirmed that the releasing rate to hydrogen peroxide water having a concentration of 1 wt % was as fast as 0.94 nm/sec and the milling rate in ion milling at an accelerating voltage of 300 V was as fast as 0.129 nm/sec. It was confirmed that all three characteristics: surface smoothness, solubility, and processability could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 6

Example 6 was performed similarly to Example 1 except that 45 atomic % of Mo, 50 atomic % of W, and 5 atomic % of $SiO_2$ were used. A phase-separated release layer of MoW-$SiO_2$ was formed by reactive sputtering similarly to Example 1 and the thickness was set to 3 nm.

The average surface roughness of the release layer was measured with the AFM similarly to Example 1, and it exhibited a very small value of 0.31 nm. Further, it was confirmed that the releasing rate to hydrogen peroxide water having a concentration of 0.5 wt % was as fast as 1.22 nm/sec and the milling rate in ion milling at an accelerating voltage of 300 V was as fast as 0.12 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 7

Example 7 was performed similarly to Example 1 except that 45 atomic % of Mo, 45 atomic % of W, and 10 atomic % of $SiO_2$ were used. A phase-separated release layer of MoW- SiO$_2$ was formed by reactive sputtering similarly to Example 1 and the thickness was set to 3 nm.

The average surface roughness of the release layer was measured with the AFM similarly to Example 1, and it exhibited a very small value of 0.283 nm. Further, it was confirmed that the releasing rate to hydrogen peroxide water having a concentration of 0.5 wt % was as fast as 0.99 nm/sec and the milling rate in ion milling at an accelerating voltage of 300 V was as fast as 0.139 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 8

Example 8 was performed similarly to Example 1 except that 60 atomic % of Mo, 20 atomic % of W, and 20 atomic % of SiO$_2$ were used. A phase-separated release layer of MoW-SiO$_2$ was formed by reactive sputtering similarly to Example 1 and the thickness was set to 3 nm.

The average surface roughness of the release layer was measured with the AFM similarly to Example 1, and it exhibited a very small value of 0.28 nm. Further, it was confirmed that the releasing rate to hydrogen peroxide water having a concentration of 0.5 wt % was as fast as 0.97 nm/sec and the milling rate in ion milling at an accelerating voltage of 300 V was as fast as 0.138 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 9

Example 9 was performed similarly to Example 1 except that 20 atomic % of Mo, 60 atomic % of W, and 20 atomic % of SiO$_2$ were used. A phase-separated release layer of MoW-SiO$_2$ was formed by reactive sputtering similarly to Example 1 and the thickness was set to 3 nm.

The average surface roughness of the release layer was measured with the AFM similarly to Example 1, and it exhibited a very small value of 0.38 nm. Further, it was confirmed that the releasing rate to hydrogen peroxide water having a concentration of 0.5 wt % was as fast as 0.89 nm/sec and the milling rate in ion milling at an accelerating voltage of 300 V was as fast as 0.148 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 10

Example 10 was performed similarly to Example 1 except that 50 atomic % of Mo, 30 atomic % of W, and 20 atomic % of SiO$_2$ were used. A phase-separated release layer of MoW-SiO$_2$ was formed by reactive sputtering similarly to Example 1 and the thickness was set to 3 nm.

The average surface roughness of the release layer was measured with the AFM similarly to Example 1, and it exhibited a very small value of 0.319 nm. Further, it was confirmed that the releasing rate to hydrogen peroxide water having a concentration of 0.5 wt % was as fast as 1.05 nm/sec and the milling rate in ion milling at an accelerating voltage of 300 V was as fast as 0.13 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 11

Example 11 was performed similarly to Example 1 except that 30 atomic % of Mo, 50 atomic % of W, and 20 atomic % of SiO$_2$ were used. A phase-separated release layer of MoW-SiO$_2$ was formed by reactive sputtering similarly to Example 1 and the thickness was set to 3 nm.

The average surface roughness of the release layer was measured with the AFM similarly to Example 1, and it exhibited a very small value of 0.34 nm. Further, it was confirmed that the releasing rate to hydrogen peroxide water having a concentration of 0.5 wt % was as fast as 0.93 nm/sec and the milling rate in ion milling at an accelerating voltage of 300 V was as fast as 0.149 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 12

Examples 12 to 17 show results where Mo and W were used as metal materials and the oxide material to be added was changed. Here, an example using a phase-separated release layer comprised of 40 atomic % of Mo, 40 atomic % of W, and 20 atomic % of oxide is shown.

Example 12 was performed similarly to Example 1 except that $TiO_2$ was used as the oxide. $TiO_2$ was produced by the reactive sputtering similarly to $SiO_2$.

The average surface roughness of the release layer was measured with the AFM similarly to Example 1, and it exhibited a very small value of 0.38 nm. Further, it was confirmed that the releasing rate to hydrogen peroxide water having a concentration of 0.5 wt % was as fast as 1.03 nm/sec and the milling rate in ion milling at an accelerating voltage of 300 V was as fast as 0.138 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 13

Example 13 was performed similarly to Example 12 except that $GeO_2$ was used as the oxide. $GeO_2$ was produced by the reactive sputtering similarly to $SiO_2$.

The average surface roughness of the release layer was measured with the AFM similarly to Example 1, and it exhibited a very small value of 0.315 nm. Further, it was confirmed that the releasing rate to hydrogen peroxide water having a concentration of 0.5 wt % was as fast as 1.21 nm/sec and the milling rate in ion milling at an accelerating voltage of 300 V was as fast as 0.146 nm/sec. It was confirmed that all the three (surface smoothness, solubility, and processability, i.e., objects in the past) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 14

Example 14 was performed similarly to Example 12 except that FeO was used as the oxide. FeO was produced by the reactive sputtering similarly to $SiO_2$.

The average surface roughness of the release layer was measured with the AFM similarly to Example 1, and it exhibited a very small value of 0.377 nm. Further, it was confirmed that the releasing rate to hydrogen peroxide water having a concentration of 0.5 wt % was as fast as 0.098 nm/sec and the milling rate in ion milling at an accelerating voltage of 300 V was as fast as 0.128 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 15

Example 15 was performed similarly to Example 12 except that ZnO was used as the oxide. ZnO was produced by the reactive sputtering similarly to $SiO_2$.

The average surface roughness of the release layer was measured with the AFM similarly to Example 1, and it exhibited a very small value of 0.29 nm. Further, it was confirmed that the releasing rate to hydrogen peroxide water having a concentration of 0.5 wt % was as fast as 0.89 nm/sec and the milling rate in ion milling at an accelerating voltage of 300 V was as fast as 0.133 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 16

Example 16 was performed similarly to Example 12 except that HfO was used as the oxide. HfO was produced by the reactive sputtering similarly to $SiO_2$.

The average surface roughness of the release layer was measured with the AFM similarly to Example 1, and it exhibited a very small value of 0.322 nm. Further, it was confirmed that the releasing rate to hydrogen peroxide water having a concentration of 0.5 wt % was as fast as 1.1 nm/sec and the milling rate in ion milling at an accelerating voltage of 300 V was as fast as 0.143 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 17

Example 17 was performed similarly to Example 1 except that $WO_3$ was used as the oxide. $WO_3$ was produced by the reactive sputtering similarly to $SiO_2$.

The average surface roughness of the release layer was measured with the AFM similarly to Example 1, and it exhibited a very small value of 0.29 nm. Further, it was confirmed that the releasing rate to hydrogen peroxide water having a concentration of 0.5 wt % was as fast as 1.18 nm/sec and the milling rate in ion milling at an accelerating voltage of 300 V was as fast as 0.15 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 18

Examples 18 to 20 show results where $SiO_2$ was used as an oxide material and two kinds of metal materials were respectively changed. Example 18 was performed similarly to Example 1 except that 40 atomic % of Ge, 40 atomic % of Mo, and 20 atomic % of $SiO_2$ were used.

The average surface roughness of the release layer was measured with the AFM similarly to Example 1, and it exhibited a very small value of 0.33 nm. Further, it was confirmed that the releasing rate to hydrogen peroxide water having a concentration of 0.5 wt % was as fast as 1.2 nm/sec and the milling rate in ion milling at an accelerating voltage of 300 V was as fast as 0.161 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 19

Example 19 was performed similarly to Example 1 except that 40 atomic % of Ge, 40 atomic % of W, and 20 atomic % of $SiO_2$ were used.

The average surface roughness of the release layer was measured with the AFM similarly to Example 1, and it exhibited a very small value of 0.363 nm. Further, it was confirmed that the releasing rate to hydrogen peroxide water having a concentration of 0.5 wt % was as fast as 1.18 nm/sec and the milling rate in ion milling at an accelerating voltage of 300 V was as fast as 0.163 nm/sec. It was confirmed that all the three (surface smoothness, solubility, and processability, i.e., objects in the past) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 20

Example 20 was performed similarly to Example 1 except that 40 atomic % of Ge, 40 atomic % of Zn, and 20 atomic % of $SiO_2$ were used.

The average surface roughness of the release layer was measured with the AFM similarly to Example 1, and it exhibited a very small value of 0.312 nm. Further, it was confirmed that the releasing rate to hydrogen peroxide water having a concentration of 0.5 wt % was as fast as 1.26 nm/sec and the milling rate in ion milling at an accelerating voltage of 300 V was as fast as 0.18 nm/sec. It was confirmed that all the three (surface smoothness, solubility, and processability, i.e., objects in the past) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 21

Examples 21 to 22 show results where the thickness was changed when forming a phase-separated release layer using 40 atomic % of Mo, 40 atomic % of W, and 20 atom % of $SiO_2$ similarly to Example 1.

Example 21 was performed similarly to Example 1 except that the thickness of the phase-separated release layer comprised of 40 atomic % of Mo, 40 atomic % of W, and 20 atom % of $SiO_2$ was set to 2 nm.

The average surface roughness of the release layer was measured with the AFM similarly to Example 1, and it exhibited a very small value of 0.278 nm. Since the materials having the same composition as that of Example 1 were used, the releasing rate to hydrogen peroxide water of having a concentration of 0.5 wt % was 1.14 nm/sec and the milling rate in ion milling at an accelerating voltage of 300 V was 0.152 nm/sec. It hardly differed from Example 1. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 22

Example 22 was performed similarly to Example 1 except that the thickness of the phase-separated release layer comprised of 40 atomic % of Mo, 40 atomic % of W, and 20 atom % of $SiO_2$ was set to 5 nm.

The average surface roughness of the release layer was measured with the AFM similarly to Example 1, and it exhibited a very small value of 0.288 nm. Since the materials having the same composition as that of Example 1 were used, the releasing rate to hydrogen peroxide water of having a concentration of 0.5 wt % was 1.14 nm/sec and the milling rate in ion milling at an accelerating voltage of 300 V was 0.152 nm/sec. It hardly differed from Example 1. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 23

Examples 23 to 27 are examples where a phase-separated release layer was formed of a material soluble in an alkali solution.

In the following examples, the phase-separated release layer was dissolved and removed by immersing in a sodium hydroxide solution prepared at a concentration of 0.05 wt % in an alkali solution for 3 minutes. Other processes (the process of forming the mask layer, the process of forming the concave-convex pattern on the resist, and the process of transferring the concave-convex pattern) were performed similarly to Example 1.

Example 23 shows an example where an alkali soluble phase-separated release layer comprised of 50 atomic % of Al, 45 atomic % of Zn, and 5 atomic % of $SiO_2$ was used. An AlZnSiO$_2$ release layer was formed by ternary reactive sputtering and the thickness was set to 5 nm.

The average surface roughness of the release layer was measured with the AFM similarly to Example 1, and it exhibited a very small value of 0.382 nm. Further, it was confirmed that the releasing rate to a sodium hydroxide solution having a concentration of 0.05 wt % was as fast as 1.79 nm/sec and the milling rate in ion milling at an accelerating voltage of 300 V was as fast as 0.138 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an alkali solution, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 24

Example 24 was performed similarly to Example 23 except that an alkali soluble phase-separated release layer comprised of 45 atomic % of Al, 45 atomic % of Zn, and 10 atomic % of $SiO_2$ was used.

The average surface roughness of the release layer was measured with the AFM similarly to Example 23, and it exhibited a very small value of 0.36 nm. Further, it was confirmed that the releasing rate to a sodium hydroxide solution having a concentration of 0.05 wt % was as fast as 1.86 nm/sec and the milling rate in ion milling at an accelerating voltage of 300 V was as fast as 0.142 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an alkali solution, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 25

Example 25 was performed similarly to Example 23 except that an alkali soluble phase-separated release layer comprised of 40 atomic % of Al, 40 atomic % of Zn, and 20 atomic % of $SiO_2$ was used.

The average surface roughness of the release layer was measured with the AFM similarly to Example 23, and it exhibited a very small value of 0.358 nm. Further, it was confirmed that the releasing rate to a sodium hydroxide solution having a concentration of 0.05 wt % was as fast as 1.92 nm/sec and the milling rate in ion milling at an accelerating voltage of 300 V was as fast as 0.141 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an alkali solution, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 26

Example 26 was performed similarly to Example 23 except that an alkali soluble phase-separated release layer comprised of 35 atomic % of Al, 35 atomic % of Zn, and 30 atomic % of $SiO_2$ was used.

The average surface roughness of the release layer was measured with the AFM similarly to Example 23, and it exhibited a very small value of 0.33 nm. Further, it was confirmed that the releasing rate to a sodium hydroxide solution having a concentration of 0.05 wt % was as fast as 1.53 nm/sec and the milling rate in ion milling at an accelerating voltage of 300 V was as fast as 0.15 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an alkali solution, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Example 27

Example 27 was performed similarly to Example 23 except that an alkali soluble phase-separated release layer comprised of 40 atomic % of Al, 40 atomic % of $B_4C$, and 20 atomic % of $SiO_2$ was used.

The average surface roughness of the release layer was measured with the AFM similarly to Example 23, and it exhibited a very small value of 0.289 nm. Further, it was confirmed that the releasing rate to a sodium hydroxide solution having a concentration of 0.05 wt % was as fast as 2.23 nm/sec and the milling rate in ion milling at an accelerating voltage of 300 V was as fast as 0.168 nm/sec. It was confirmed that all the three (surface smoothness, solubility, and processability) could be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an alkali solution, similarly to Example 1. The flying height of the head from the obtained magnetic recording medium was measured with a glide height tester and the evaluation of the flying qualities was performed. As a result, the measurement height exceeded a flying height of 10 nm which is the standard required to perform the read/write evaluation process.

Comparative Example 1

Comparative Example 1 is an example where only Mo was used as the release layer and the other contents are the same as those in Example 1. In this example, the island-like underlayer in the examples was not formed.

An Mo release layer was produced by the DC sputtering method and the thickness was set to 3 nm. The average surface roughness of the release layer was measured with the AFM after formation of the Mo release layer, and it was 0.4 nm which was larger than that of the granular phase-separated release layer. Thus, degradation in surface smoothness was confirmed. The releasing rate to hydrogen peroxide water of having a concentration of 0.5 wt % was 0.82 nm/sec and the milling rate in ion milling at an accelerating voltage of 300 V was 0.1 nm/sec and both the results were less than the values of the phase-separated release layer. In this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, great variation in the concave-convex pattern was observed. Further, a large number of hits to the scanned head was observed in released residues formed in the surface.

Comparative Example 2

Comparative Example 2 is an example where only W was used as the release layer and the other contents are the same as those in Example 1. A W release layer was produced by the DC sputtering method and the thickness was set to 3 nm. In this example, the island-like underlayer in the examples was not formed. The average surface roughness of the release layer was measured with the AFM after formation of the W release layer, and it was 0.44 nm which was larger than that of the granular phase-separated release layer. Thus, degradation in surface smoothness was confirmed. The releasing rate to hydrogen peroxide water having a concentration of 0.5 wt % was significantly low (0.08 nm/sec), and a decrease in dissolution rate due to oxidation was observed. The milling rate in ion milling at an accelerating voltage of 300 V was 0.099 nm/sec. The results showed that the release layer had characteristics inferior to those of the phase-separated release layer. In this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the number of releasing defects of the concave-convex pattern in the surface of the alloy film was increased by the influence of the hall-like defects generated in the W film, and a large number of hits to the scanned head was observed in released residues formed in the surface.

Comparative Example 3

Comparative Example 3 is an example where a binary alloy release layer comprised of 50 atomic % of Mo and 50 atomic % of W was used as the release layer and the other contents are the same as those in Example 1. In this example, the island-like underlayer in the examples was not formed.

Mo and W were produced by the DC sputtering method and the thickness was set to 3 nm.

The average surface roughness of the release layer was measured with the AFM after formation of the MoW release layer, and it was 0.38 nm. This value smaller than that of the case where the Mo metal film was used in Comparative Example 1, however it was larger than that of the granular phase-separated release layer. Thus, degradation in surface smoothness was confirmed. The releasing rate to hydrogen peroxide water having a concentration of 0.5 wt % was 0.537 nm/sec and the milling rate in ion milling at an accelerating voltage of 300 V was 0.107 nm/second. The results showed that the release layer had characteristics inferior to those of the phase-separated release layer. In this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film was significantly reduced by oxidation of W, and thus there were many releasing defects of the concave-convex pattern, and a large number of hits to the scanned head was observed in released residues formed in the surface.

Comparative Example 4

Comparative Example 4 is an example where a binary alloy release layer comprised of 50 atomic % of Mo and 50 atomic % of W was used as the release layer and the other contents are the same as those in Example 1. Mo and $SiO_2$ were produced by the reactive sputtering and the thickness was set to 3 nm.

The average surface roughness of the release layer was measured with the AFM after formation of the $MoSiO_2$ release layer, and it was 0.44 nm. The releasing rate to hydrogen peroxide water having a concentration of 0.5 wt % was 0.769 nm/sec and the milling rate in ion milling at an accelerating voltage of 300 V was 0.129 nm/second. The results showed that characteristics of the alloy release layer obtained by adding the oxide material to the single metal film were inferior to those of the phase-separated release layer. In this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, there were many releasing defects of the concave-convex pattern in the surface of the alloy film due to deterioration in surface roughness, and a large number of hits to the scanned head was observed in released residues formed in the surface.

Comparative Example 5

Comparative Example 5 is an example where a binary alloy release layer comprised of 90 atomic % of Mo and 10 atomic % of $SiO_2$ was used as the release layer and the other contents are the same as those in Example 1. Mo and $SiO_2$ were produced by the reactive sputtering and the thickness was set to 3 nm.

The average surface roughness of the release layer was measured with the AFM after formation of the $MoSiO_2$ release layer, and it was 0.42 nm. The releasing rate to hydrogen peroxide water having a concentration of 0.5 wt % was 0.857 nm/sec and the milling rate in ion milling at an accelerating voltage of 300 V was 0.133 nm/second. The results showed that characteristics of the alloy release layer obtained by adding the oxide material to the single metal film were inferior to those of the phase-separated release layer. In this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, there were many releasing defects of the concave-convex pattern in the surface of the alloy film due to deterioration in surface roughness, and a large number of hits to the scanned head was observed in released residues formed in the surface.

Comparative Example 6

Comparative Example 6 is an example where a binary alloy release layer comprised of 80 atomic % of Mo and 20 atomic % of $SiO_2$ was used as the release layer and the other contents are the same as those in Example 1. Mo and $SiO_2$ were produced by the reactive sputtering and the thickness was set to 3 nm.

The average surface roughness of the release layer was measured with the AFM after formation of the $MoSiO_2$ release layer, and it was 0.45 nm. The releasing rate to hydrogen peroxide water having a concentration of 0.5 wt % was 1.1 nm/sec and the milling rate in ion milling at an accelerating voltage of 300 V was 0.145 nm/second. The results showed that characteristics of the alloy release layer obtained by adding the oxide material to the single metal film were inferior to those of the phase-separated release layer. In this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, there were many releasing defects of the concave-convex pattern in the surface of the alloy film due to deterioration in surface roughness, and a large number of hits to the scanned head was observed in released residues formed in the surface. However, the flying test at 10 nm could be passed.

Comparative Example 7

Comparative Example 7 is an example where a binary alloy release layer comprised of 70 atomic % of Mo and 30 atomic % of $SiO_2$ was used as the release layer and the other contents are the same as those in Example 1. Mo and $SiO_2$ were produced by the reactive sputtering and the thickness was set to 3 nm.

The average surface roughness of the release layer was measured with the AFM after formation of the $MoSiO_2$ release layer, and it was 0.44 nm. The releasing rate to hydrogen peroxide water having a concentration of 0.5 wt % was 0.7 nm/sec and the milling rate in ion milling at an accelerating voltage of 300 V was 0.163 nm/second. The results showed that characteristics of the alloy release layer obtained by adding the oxide material to the single metal film were inferior to those of the phase-separated release layer. In this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface.

Comparative Example 8

Comparative Example 8 is an example where a binary alloy release layer comprised of 60 atomic % of Mo and 40 atomic % of $SiO_2$ was used as the release layer and the other contents are the same as those in Example 1. Mo and $SiO_2$ were produced by the reactive sputtering and the thickness was set to 3 nm.

The average surface roughness of the release layer was measured with the AFM after formation of the $MoSiO_2$ release layer, and it was 0.44 nm. The releasing rate to hydrogen peroxide water having a concentration of 0.5 wt % was decreased to 0.03 nm/sec or less by an increase in additive amount of $SiO_2$. Further, the dissolution was not facilitated by passivation of the surface of the release layer during dissolution, resulting in formation of released residues. The milling rate in ion milling at an accelerating voltage of 300 V was 0.182 nm/sec. The milling rate of the release layer was increased by addition of $SiO_2$ at a fast ion milling rate. However, the releasing rate and the surface smoothness were deteriorated. Accordingly, in this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface.

Comparative Example 9

Comparative Example 9 is an example where a binary alloy release layer comprised of 50 atomic % of Mo and 50 atomic % of $SiO_2$ was used as the release layer and the other contents are the same as those in Example 1. Mo and $SiO_2$ were produced by the reactive sputtering and the thickness was set to 3 nm. The average surface roughness of the release layer was measured with the AFM after formation of the $MoSiO_2$ release layer, and it was 0.4 nm. The releasing rate to hydrogen peroxide water having a concentration of 0.5 wt % was decreased to 0.03 nm/sec or less by an increase in additive amount of $SiO_2$. Further, the dissolution was not facilitated by passivation of the surface of the release layer during dissolution, resulting in formation of released residues. The milling rate in ion milling at an accelerating voltage of 300 V was 2.1 nm/sec. The milling rate of the release layer was increased by addition of $SiO_2$ at a fast ion milling rate. However, the releasing rate and the surface smoothness were deteriorated. Accordingly, in this example, all the three (surface smoothness, solubility, and processability) as to the granular release layer could not be improved.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface.

Comparative Example 10

Comparative Examples 10 to 15 are examples of a binary material where W was used as a metal material and $SiO_2$ was used as an oxide material and the material composition was changed. This example is an example where a binary alloy release layer comprised of 95 atomic % of W and 5 atomic % of $SiO_2$ was used as the release layer and the other contents are the same as those in Example 1. W and $SiO_2$ were produced by the reactive sputtering and the thickness was set to 5 nm. The average surface roughness of the release layer was measured with the AFM after formation of the $WSiO_2$ release layer, and it was 0.42 nm. The releasing rate to hydrogen peroxide water having a concentration of 0.5 wt % was very slow (0.16 nm/sec). Further, released residues were formed by passivation of the release layer during dissolution. The milling rate in ion milling at an accelerating voltage of 300 V was 0.095 nm/sec. Similarly to the case of $MoSiO_2$, the results showed that characteristics of the alloy release layer obtained by adding the oxide material to the single metal film were inferior to those of the phase-separated release layer. In this example, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the number of transfer defects of the concave-convex pattern was increased by the influence of hall-like defects generated in W. Further, there were many releasing defects of the concave-convex pattern in the surface, and a large number of hits to the scanned head was observed in released residues formed in the surface.

Comparative Example 11

Comparative Example 11 is an example where a binary alloy release layer comprised of 90 atomic % of W and 10 atomic % of $SiO_2$ was used as the release layer and the other contents are the same as those in Example 10. W and $SiO_2$ were produced by the reactive sputtering and the thickness was set to 3 nm. The average surface roughness of the release layer was measured with the AFM after formation of the $WSiO_2$ release layer, and it was 0.5 nm. The releasing rate to hydrogen peroxide water having a concentration of 0.5 wt % was 1.03 nm/sec. If $SiO_2$ was added in an atomic weight % of 10 or more, diffusion of $SiO_2$ to the W film was uniformed and the net density of W was decreased, resulting in an improvement in the releasing rate. In the case of an additive amount of 10%, the diffusion of $SiO_2$ to the W film was more uniform than that in the case of an additive amount of 5%, resulting in no decrease in the dissolution rate due to the composition nonuniformity. The milling rate in ion milling at an accelerating voltage of 300 V was 0.105 nm/sec.

However, similarly to the case of Example 10, the results showed that characteristics of the alloy release layer obtained by adding the oxide material to the single metal film were inferior to those of the phase-separated release layer. In this example, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, there were many transfer defects of the concave-convex pattern. Further, there were many releasing defects of the concave-convex pattern in the surface, and a large number of hits to the scanned head was observed in released residues formed in the surface.

Comparative Example 12

Comparative Example 12 is an example where a binary alloy release layer comprised of 80 atomic % of W and 20 atomic % of $SiO_2$ was used as the release layer and the other contents are the same as those in Example 10. W and $SiO_2$ were produced by the reactive sputtering and the thickness was set to 3 nm. The average surface roughness of the release layer was measured with the AFM after formation of the $WSiO_2$ release layer, and it was 0.46 nm. The releasing rate to hydrogen peroxide water having a concentration of 0.5 wt % was 1.22 nm/sec. It was confirmed that the releasing rate was improved by a decrease in the net density of W due to an increase in the additive amount of $SiO_2$. At this time, no passivation of the release layer shown in Comparative Example 10 was observed. It was found that the releasing rate was further improved as compared with the case of the W metal film alone. The milling rate in ion milling at an accelerating voltage of 300 V was 0.106 nm/sec. The dissolution rate and the milling rate could be improved by adding an appropriate amount of $SiO_2$ to the W film. However, the average surface roughness was deteriorated as compared with the case of the W film alone. As the result, in this example, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, there were many transfer defects of the concave-convex pattern. Further, there were many releasing defects of the concave-convex pattern in the surface, and a large number of hits to the scanned head was observed in released residues formed in the surface. However, the flying test at 10 nm could be passed.

Comparative Example 13

Comparative Example 13 is an example where a binary alloy release layer comprised of 90 atomic % of W and 10 atomic % of $SiO_2$ was used as the release layer and the other contents are the same as those in Example 10. W and $SiO_2$ were produced by the reactive sputtering and the thickness was set to 3 nm. The average surface roughness of the release layer was measured with the AFM after formation of the $WSiO_2$ release layer, and it was 0.46 nm. The releasing rate to hydrogen peroxide water having a concentration of 0.5 wt % was 0.129 nm/sec. The solubility was reduced by addition of an excessive amount of $SiO_2$. It was found that the dissolution rate was significantly slow. Similarly to the case shown in Comparative Example 10, releasing was inhibited by passivation of the release layer during dissolution. The milling rate in ion milling at an accelerating voltage of 300 V was 0.108 nm/sec. In this example, improvements in the dissolution rate and the ion milling rate by addition of $SiO_2$ addition were observed. However, the surface smoothness was deteriorated as compared with the case of the W film alone. As the result, in this example, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, there were many transfer defects of the concave-convex pattern. Further, there were many releasing defects of the concave-convex pattern in the surface, and a large number of hits to the scanned head was observed in released residues formed in the surface.

Comparative Example 14

Comparative Example 14 is an example where a binary alloy release layer comprised of 60 atomic % of W and 40 atomic % of $SiO_2$ was used as the release layer and the other contents are the same as those in Example 1. W and $SiO_2$ were produced by the reactive sputtering and the thickness was set to 3 nm. The average surface roughness of the release layer was measured with the AFM after formation of the $WSiO_2$ release layer, and it was 0.45 nm. The releasing rate to hydrogen peroxide water having a concentration of 0.5 wt % was significantly low (0.03 nm/sec). Similarly to the case shown in Comparative Example 10, releasing was not facilitated by passivation of the release layer during dissolution, resulting in formation of released residues. The milling rate in ion milling at an accelerating voltage of 300 V was 0.122 nm/sec. In this example, improvements in the dissolution rate and the ion milling rate by addition of $SiO_2$ were observed. However, the surface smoothness and the solubility were deteriorated as compared with the case of the W film alone. As the result, in this example, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface.

Comparative Example 15

Comparative Example 15 is an example where a binary alloy release layer comprised of 50 atomic % of W and 50 atomic % of $SiO_2$ was used as the release layer and the other contents are the same as those in Example 1. W and $SiO_2$ were produced by the reactive sputtering and the thickness was set to 3 nm. The average surface roughness of the release layer was measured with the AFM after formation of the $WSiO_2$ release layer, and it was 0.43 nm. The releasing rate to hydrogen peroxide water having a concentration of 0.5 wt % was significantly low (0.03 nm/sec). Similarly to the case shown in Comparative Example 10, releasing was not facilitated by passivation of the release layer during dissolution, resulting in formation of released residues. The milling rate in ion milling at an accelerating voltage of 300 V was 0.153 nm/sec. In this example, improvements in the dissolution rate and the ion milling rate by addition of $SiO_2$ were observed. However, the surface smoothness and the solubility were deteriorated as compared with the case of the W film alone. As the result, in this example, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface.

Comparative Example 16

Comparative Example 16 is an example where a ternary alloy release layer comprised of 35 atomic % of Mo, 35 atomic % of W, and 30 atomic % of $SiO_2$ was used as the release layer and the other contents are the same as those in Example 1. Mo, W, and $SiO_2$ were produced by the reactive sputtering and the thickness was set to 3 nm.

The average surface roughness of the release layer was measured with the AFM after formation of the $MoWSiO_2$ release layer, and it was 0.42 nm. The releasing rate to hydrogen peroxide water having a concentration of 0.5 wt % was 1.0 nm/sec. In this case, no inhibition of dissolution due to the passivation shown in Comparative Example 10 was observed. The milling rate in ion milling at an accelerating voltage of 300 V was 0.162 nm/sec. In this example, a release layer comprised of two kinds of soluble metals and one kind of oxide material was formed similarly to Example 1. If the additive amount of $SiO_2$ was increased, improvements in the dissolution rate and the milling rate were observed. However, the surface smoothness was deteriorated. As compared with the case of the Mo metal film alone, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface. However, the flying test at 10 nm could be passed.

Comparative Example 17

Comparative Example 17 is an example where a ternary alloy release layer comprised of 30 atomic % of Mo, 30 atomic % of W, and 40 atomic % of $SiO_2$ was used as the release layer and the other contents are the same as those in Example 1. Mo, W, and $SiO_2$ were produced by the reactive sputtering and the thickness was set to 3 nm.

The average surface roughness of the release layer was measured with the AFM after formation of the $MoWSiO_2$ release layer, and it was 0.4 nm. The releasing rate to hydrogen peroxide water having a concentration of 0.5 wt % was significantly low (0.03 nm/sec). Similarly to the case shown in Comparative Example 10, releasing was not facilitated by passivation of the release layer during dissolution, resulting in formation of released residues. The milling rate in ion milling at an accelerating voltage of 300 V was 0.177 nm/sec. In this example, a release layer comprised of two kinds of soluble metals and one kind of oxide material was formed similarly to Example 1. If the additive amount of $SiO_2$ was increased, an improvement in the dissolution rate was observed. However, the Solubility was significantly deteriorated. As compared with the case of the Mo metal film alone, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface.

Comparative Example 18

Comparative Example 18 is an example where a ternary alloy release layer comprised of 25 atomic % of Mo, 25 atomic % of W, and 50 atomic % of $SiO_2$ was used as the release layer and the other contents are the same as those in Example 1. Mo, W, and $SiO_2$ were produced by the reactive sputtering and the thickness was set to 3 nm.

The average surface roughness of the release layer was measured with the AFM after formation of the $MoWSiO_2$ release layer, and it was 0.41 nm. The releasing rate to hydrogen peroxide water having a concentration of 0.5 wt % was significantly low (0.03 nm/sec). Similarly to the case shown in Comparative Example 10, releasing was not facilitated by passivation of the release layer during dissolution, resulting in formation of released residues. The milling rate in ion milling at an accelerating voltage of 300 V was 0.181 nm/sec. In this example, a release layer comprised of two kinds of soluble metals and one kind of oxide material was formed similarly to Example 1. If the additive amount of $SiO_2$ was increased, an improvement in the dissolution rate was observed. However, the Solubility was significantly deteriorated. As compared with the case of the Mo metal film alone, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate of the alloy film containing a large amount of $SiO_2$ was significantly reduced, and thus there were many releasing defects of the concave-convex pattern in the surface, and a large number of hits to the scanned head was observed in released residues formed in the surface.

Comparative Example 19

Comparative Example 19 is an example where a ternary metal release layer obtained by adding 40 atomic % of Mo, 40 atomic % of W, and metal was used. Specifically, it is an example where 20 atomic % of Si was added and the other contents are the same as those in Example 1. Mo, W, and Si were produced by the reactive sputtering and the thickness was set to 3 nm.

The average surface roughness of the release layer was measured with the AFM after formation of the $MoWSiO_2$ release layer, and it was 0.46 nm. The releasing rate to hydrogen peroxide water having a concentration of 0.5 wt % was significantly low (0.13 nm/sec). Similarly to the case shown in Comparative Example 10, releasing was not facilitated by passivation of the release layer during dissolution, resulting in formation of released residues. The milling rate in ion milling at an accelerating voltage of 300 V was 0.092 nm/sec. In this example, a release layer comprised of two kinds of soluble metals and one kind of metal material was formed. As compared with the case of the Mo metal film alone or the case of the granular phase-separated release layer formed by adding an oxide, the three (surface smoothness, solubility, and processability) as to the granular release layer could not be improved at the same time. The upper surface and cross section of the release layer were observed with a transmission electron microscope, and no clear phase separation was observed. It was confirmed that the layer was in alloy film form.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the processing rate and the releasing rate were significantly decreased by the addition of the metal material, the releasing process could not be performed. Thus, convex residues could not be removed from the surface of the medium.

Comparative Example 20

Comparative Example 20 is an example where an alloy release layer comprised of 40 atomic % of Mo, 40 atomic % of W, and 20 atomic % of Cr was used as the release layer and the other contents are the same as those in Example 1. Mo, W, and Cr were produced by the reactive sputtering and the thickness was set to 3 nm.

The average surface roughness of the release layer was measured with the AFM after formation of the MoWCr release layer, and it was 0.4 nm. The releasing rate to hydrogen peroxide water having a concentration of 0.5 wt % was 0.64 nm/sec. In this case, similarly to Comparative Example 10, the dissolution was inhibited in the middle by passivation of the release layer, resulting in generation of releasing defects. The milling rate in ion milling at an accelerating voltage of 300 V was 0.075 nm/sec. It was confirmed that the releasing rate was decreased by the addition of Cr. Similarly to Comparative Example 19, in this example, a release layer comprised of two kinds of soluble metals and one kind of metal material was formed, and the dissolution rate and the ion milling rate were decreased. As compared with the case of the Mo metal film alone or the case of the granular phase-separated release layer formed by adding an oxide, the three (surface smoothness, solubility, and processability) as to the granular release layer could not be improved at the same time. The upper surface and cross section of the release layer were observed with a transmission electron microscope, and no clear phase separation was observed. It was confirmed that the layer was in alloy film form.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the processing rate and the releasing rate were significantly decreased by the addition of the metal material, the releasing process could not be performed. Thus, convex residues could not be removed from the surface of the medium.

Comparative Example 21

Comparative Example 21 is an example where an alloy release layer comprised of 40 atomic % of Mo, 40 atomic % of W, and 20 atomic % of V was used as the release layer and the other contents are the same as those in Example 1. Mo, W, and V were produced by the reactive sputtering and the thickness was set to 3 nm.

The average surface roughness of the release layer was measured with the AFM after formation of the MoWV release layer, and it was 0.36 nm. The releasing rate to hydrogen peroxide water having a concentration of 0.5 wt % was 0.58 nm/sec. In this case, similarly to Comparative Example 10, the dissolution was inhibited in the middle by passivation of the release layer, resulting in generation of releasing defects. The milling rate in ion milling at an accelerating voltage of 300 V was 0.09 nm/sec. It was confirmed that the releasing rate was decreased by the addition of V. Similarly to Comparative Example 19, in this example, a release layer comprised of two kinds of soluble metals and one kind of metal material was formed, and the surface smoothness was improved. However, the dissolution rate and the ion milling rate were decreased. As compared with the case of the Mo metal film alone or the case of the granular phase-separated release layer formed by adding an oxide, the three (surface smoothness, solubility, and processability) as to the granular release layer could not be improved at the same time. The upper surface and cross section of the release layer were observed with a transmission electron microscope, and no clear phase separation was observed. It was confirmed that the layer was in alloy film form.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the processing rate and the releasing rate were significantly decreased by the addition of the metal material, the releasing process could not be performed. Thus, convex residues could not be removed from the surface of the medium.

Comparative Example 22

Comparative Example 22 is an example where an island-like underlayer was not formed before formation of the granular phase-separated release layer in contrast to Example 1. The release layer was comprised of 40 atomic % of Mo, 40 atomic % of W, and 20 atomic % of $SiO_2$ similarly to Example 1. The processing process was performed similarly to Example 1 except that the island-like underlayer was not formed.

The average surface roughness of the $MoWSiO_2$ film formed without forming an island-like underlayer was actually measured with the AFM, and the value was 0.388 nm. Further, the releasing rate to hydrogen peroxide water having a concentration of 0.5 wt % was 0.622 nm/sec and the value was lower than that in the case of the Mo film alone. In this case, similarly to Comparative Example 10, the dissolution was inhibited in the middle by passivation of the release layer, resulting in generation of releasing defects. The milling rate in ion milling at an accelerating voltage of 300 V was 0.158 nm/sec and the value was higher than that of the granular release layer formed after forming the island-like underlayer. Further, the surface of the release layer and the cross-sectional structure were observed using a transmission electron microscope, the form of phase separation could not be confirmed. Additionally, it was found that non-uniform patterns were mixed. Accordingly, when the island-like underlayer is not formed, phase separation is not facilitated and the formed release layer is alloyed. Further, the releasing rate is decreased by addition of $SiO_2$ poorly-soluble in a peeling solution. In this example, the surface smoothness and the milling rate of the release layer were improved. However, the dissolution rate was decreased. As compared with the case of the Mo metal film alone and the case of the granular phase-separated release layer containing an oxide which was formed after forming the island-like underlayer, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 1. The flying height of the head from the obtained magnetic recording medium was measured with a glide height tester and the evaluation of the flying qualities was performed. As the result, the releasing rate was significantly reduced by addition of the metal material, and thus releasing defects were generated. This resulted in remaining of many convex residues on the surface of the medium. Further, a large number of hits of residue to the head scanned on the surface of the medium was observed Comparative Example 23

Comparative Example 23 is an example where an alkali-soluble metal film was used alone in place of the alkali-soluble granular release layer in contrast to Example 23. Specifically, it is an example where 100% Al metal film was used as the alkali-soluble metal film and a 3-nm-thick film was formed by the DC sputtering method. Other processing processes were performed similarly to Example 23. In this example, the island-like underlayer in the examples was not formed.

In the case of the Al film alone, the average surface roughness was actually measured with the AFM, the value was 0.544 nm. It was higher than the case of the Al granular phase-separated release layer which was formed after forming the island-like underlayer. It was found that the surface smoothness was deteriorated. The dissolution rate when a sodium hydroxide solution prepared at a concentration of 0.05 wt % was used as a peeling solution was 0.58 nm/sec. In this case, similarly to Comparative Example 10, the dissolution was inhibited in the middle by passivation of the release layer, resulting in generation of releasing defects. The milling rate in ion milling at an accelerating voltage of 300 V was 0.089 nm/sec. In this example, as compared with the case of the granular phase-separated release layer formed by adding an oxide, the surface smoothness, solubility, and processability were deteriorated. Accordingly, the three could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 23. The flying height of the head from the obtained magnetic recording medium was measured with a glide height tester and the evaluation of the flying qualities was performed. As the result, the releasing rate was significantly reduced by addition of the metal material, and thus releasing defects were generated. This resulted in remaining of many convex residues on the surface of the medium. Further, a large number of hits of residue to the head scanned on the surface of the medium was observed Comparative Example 24

Comparative Example 24 is an example where an island-like underlayer was not formed before formation of the alkali-soluble granular phase-separated release layer in contrast to Example 25. The release layer was comprised of 40 atomic % of Al, 40 atomic % of Zn, and 20 atomic % of $SiO_2$ similarly to Example 25. The processing process was performed similarly to Example 25 except that the island-like underlayer was not formed.

The average surface roughness of the $AlZnSiO_2$ film formed without forming an island-like underlayer was actually measured with the AFM, and the value was 0.48 nm.

The releasing rate to a sodium hydroxide solution having a concentration of 0.05 wt % was significantly low and the value was 0.03 nm/sec. Further, it was confirmed that the dissolution was inhibited in the middle by passivation of the release layer during dissolution. The milling rate in ion milling at an accelerating voltage of 300 V was 0.92 nm/sec. In this example, the surface smoothness and the milling rate of the release layer were improved by addition of $SiO_2$. However, the phase separation in the release layer was not facilitated because of any presence of the island-like underlayer. A release layer of a ternary alloy containing $SiO_2$ was formed, and thus the dissolution rate was decreased. In fact, the surface of the release layer and the cross-sectional structure were observed using a transmission electron microscope, the form of phase separation could not be confirmed. Additionally, it was found that non-uniform patterns were mixed. Accordingly, when the island-like underlayer is not formed, phase separation is not facilitated and the formed release layer is alloyed. Further, the releasing rate is decreased by addition of $SiO_2$ poorly-soluble in a peeling solution. In this example, the surface smoothness and the milling rate of the release layer were improved. However, the dissolution rate was decreased. As compared with the case of the Mo metal film alone and the case of the alkali-soluble granular phase-separated release layer containing an oxide which was formed after forming the island-like underlayer, the three (surface smoothness, solubility, and processability) as to the granular release layer could not be improved at the same time.

Hereafter, a magnetic recording medium having a concave-convex pattern was produced by forming a mask layer, a resist layer, and a concave-convex pattern on the resist layer, transferring the concave-convex pattern to the phase-separated release layer and the magnetic recording layer, and dissolving and removing the phase-separated release layer with an acid solution, similarly to Example 25. The flying height of the head from the obtained magnetic recording medium was measured with a glide height tester and the evaluation of the flying qualities was performed. As the result, the releasing rate was significantly reduced by addition of the metal material, and thus releasing defects were generated. This resulted in remaining of many convex residues on the surface of the medium. Further, a large number of hits of residue to the head scanned on the surface of the medium was observed The obtained results are shown in Tables 1 to 6 below.

TABLE 1

|  |  | First metal | | Second metal | | Oxide | | Peeling solution | Glide evaluation | Processing method |
| --- | --- | --- | --- | --- | --- | --- | --- | --- | --- | --- |
|  |  | Material | Composition (atomic %) | Material | Composition (atomic %) | Material | Composition (atomic %) |  |  |  |
| Examples | 1 | Mo | 40 | W | 40 | SiO$_2$ | 20 | H$_2$O$_2$ | 10 nm○ | EB lithography |
|  | 2 | Mo | 40 | W | 40 | SiO$_2$ | 20 | H$_2$O$_2$ | 10 nm○ | Self-assembly |
|  | 3 | Mo | 40 | W | 40 | SiO$_2$ | 20 | H$_2$O$_2$ | 10 nm○ | Metal fine particles |
|  | 4 | Mo | 40 | W | 40 | SiO$_2$ | 20 | H$_2$O$_2$ | 10 nm○ | Nanoimprint |
|  | 5 | Mo | 40 | W | 40 | SiO$_2$ | 20 | H$_2$O$_2$ | 10 nm○ | EB lithography |
|  | 6 | Mo | 50 | W | 45 | SiO$_2$ | 5 | H$_2$O$_2$ | 10 nm○ | EB lithography |
|  | 7 | Mo | 45 | W | 50 | SiO$_2$ | 5 | H$_2$O$_2$ | 10 nm○ | EB lithography |
|  | 8 | Mo | 45 | W | 45 | SiO$_2$ | 10 | H$_2$O$_2$ | 10 nm○ | EB lithography |
|  | 9 | Mo | 60 | W | 20 | SiO$_2$ | 20 | H$_2$O$_2$ | 10 nm○ | EB lithography |
|  | 10 | Mo | 20 | W | 60 | SiO$_2$ | 20 | H$_2$O$_2$ | 10 nm○ | EB lithography |
|  | 11 | Mo | 50 | W | 30 | SiO$_2$ | 20 | H$_2$O$_2$ | 10 nm○ | EB lithography |
|  | 12 | Mo | 30 | W | 50 | SiO$_2$ | 20 | H$_2$O$_2$ | 10 nm○ | EB lithography |
|  | 13 | Mo | 40 | W | 40 | TiO$_2$ | 20 | H$_2$O$_2$ | 10 nm○ | EB lithography |
|  | 14 | Mo | 40 | W | 40 | GeO$_2$ | 20 | H$_2$O$_2$ | 10 nm○ | EB lithography |
|  | 15 | Mo | 40 | W | 40 | FeO | 20 | H$_2$O$_2$ | 10 nm○ | EB lithography |
|  | 16 | Mo | 40 | W | 40 | ZnO | 20 | H$_2$O$_2$ | 10 nm○ | EB lithography |
|  | 17 | Mo | 40 | W | 40 | HfO$_2$ | 20 | H$_2$O$_2$ | 10 nm○ | EB lithography |
|  | 18 | Mo | 40 | W | 40 | WO$_3$ | 20 | H$_2$O$_2$ | 10 nm○ | EB lithography |
|  | 19 | Ge | 40 | Mo | 40 | SiO$_2$ | 20 | H$_2$O$_2$ | 10 nm○ | EB lithography |
|  | 20 | Ge | 40 | W | 40 | SiO$_2$ | 20 | H$_2$O$_2$ | 10 nm○ | EB lithography |
|  | 21 | Ge | 40 | Zn | 40 | SiO$_2$ | 20 | H$_2$O$_2$ | 10 nm○ | EB lithography |

TABLE 2

|  |  | Average surface roughness (nm) | Dissolution rate (nm/sec) | Milling rate (nm/sec) |
| --- | --- | --- | --- | --- |
| Examples | 1 | 0.282 | 1.14 | 0.152 |
|  | 2 | 0.282 | 1.14 | 0.152 |
|  | 3 | 0.282 | 1.14 | 0.152 |
|  | 4 | 0.282 | 1.14 | 0.152 |
|  | 5 | 0.298 | 0.94 | 0.129 |
|  | 6 | 0.31 | 1.22 | 0.12 |
|  | 7 | 0.283 | 0.99 | 0.139 |
|  | 8 | 0.28 | 0.97 | 0.138 |
|  | 9 | 0.33 | 0.89 | 0.148 |
|  | 10 | 0.319 | 1.05 | 0.13 |
|  | 11 | 0.34 | 0.93 | 0.149 |
|  | 12 | 0.38 | 1.03 | 0.133 |
|  | 13 | 0.315 | 1.21 | 0.146 |
|  | 14 | 0.377 | 0.98 | 0.128 |
|  | 15 | 0.29 | 0.89 | 0.133 |
|  | 16 | 0.322 | 1.1 | 0.143 |
|  | 17 | 0.29 | 1.18 | 0.15 |
|  | 18 | 0.33 | 1.2 | 0.161 |
|  | 19 | 0.363 | 1.18 | 0.163 |
|  | 20 | 0.312 | 1.26 | 0.18 |
|  | 21 | 0.278 | 1.14 | 0.152 |

TABLE 3

|  |  | First metal | | Second metal | | Oxide | | Peeling solution | Glide evaluation | Processing method |
| --- | --- | --- | --- | --- | --- | --- | --- | --- | --- | --- |
|  |  | Material | Composition (atomic %) | Material | Composition (atomic %) | Material | Composition (atomic %) |  |  |  |
| Examples | 22 | Mo | 40 | W | 40 | SiO$_2$ | 20 | H$_2$O$_2$ | 10 nm○ | EB lithography |
|  | 23 | Al | 50 | Zn | 45 | SiO$_2$ | 5 | H$_2$O$_2$ | 10 nm○ | EB lithography |
|  | 24 | Al | 45 | Zn | 45 | SiO$_2$ | 10 | H$_2$O$_2$ | 10 nm○ | EB lithography |
|  | 25 | Al | 40 | Zn | 40 | SiO$_2$ | 20 | H$_2$O$_2$ | 10 nm○ | EB lithography |
|  | 26 | Al | 35 | Zn | 35 | SiO$_2$ | 30 | H$_2$O$_2$ | 10 nm○ | EB lithography |
|  | 27 | Al | 40 | B4C | 40 | SiO$_2$ | 20 | H$_2$O$_2$ | 10 nm○ | EB lithography |
| Comparative Examples | 1 | Mo | 100 | — | — | — | — | H$_2$O$_2$ | 10 nmΔ | EB lithography |
|  | 2 | W | 100 | — | — | — | — | H$_2$O$_2$ | 10 nmΔ | EB lithography |
|  | 3 | Mo | 50 | W | 50 | — | — | H$_2$O$_2$ | 10 nmΔ | EB lithography |
|  | 4 | Mo | 95 | — | — | SiO$_2$ | 5 | H$_2$O$_2$ | 10 nmΔ | EB lithography |
|  | 5 | Mo | 90 | — | — | SiO$_2$ | 10 | H$_2$O$_2$ | 10 nmΔ | EB lithography |
|  | 6 | Mo | 80 | — | — | SiO$_2$ | 20 | H$_2$O$_2$ | 10 nmΔ | EB lithography |
|  | 7 | Mo | 70 | — | — | SiO$_2$ | 30 | H$_2$O$_2$ | 10 nmΔ | EB lithography |
|  | 8 | Mo | 60 | — | — | SiO$_2$ | 40 | H$_2$O$_2$ | 10 nmΔ | EB lithography |
|  | 9 | Mo | 50 | — | — | SiO$_2$ | 50 | H$_2$O$_2$ | 10 nmΔ | EB lithography |

TABLE 4

|  |  | Average surface roughness (nm) | Dissolution rate (nm/sec) | Milling rate (nm/sec) |
|---|---|---|---|---|
| Examples | 22 | 0.288 | 1.14 | 0.152 |
|  | 23 | 0.382 | 1.79 | 0.138 |
|  | 24 | 0.36 | 1.86 | 0.142 |
|  | 25 | 0.358 | 1.92 | 0.141 |
|  | 26 | 0.33 | 1.53 | 0.15 |
|  | 27 | 0.289 | 2.23 | 0.168 |
| Comparative Examples | 1 | 0.4 | 0.82 | 0.1 |
|  | 2 | 0.44 | 0.08 | 0.099 |
|  | 3 | 0.38 | 0.537 | 0.107 |
|  | 4 | 0.44 | 0.769 | 0.129 |
|  | 5 | 0.42 | 0.857 | 0.133 |
|  | 6 | 0.45 | 1.1 | 0.145 |
|  | 7 | 0.44 | 0.7 | 0.163 |
|  | 8 | 0.44 | <0.03 | 0.182 |
|  | 9 | 0.4 | <0.03 | 2.1 |

TABLE 5

|  |  | First metal | | Second metal | | Oxide | | Peeling solution | Glide evaluation | Processing method |
|---|---|---|---|---|---|---|---|---|---|---|
|  |  | Material | Composition (atomic %) | Material | Composition (atomic %) | Material | Composition (atomic %) | | | |
| Comparative Examples | 10 | — | | W | 95 | $SiO_2$ | 5 | $H_2O_2$ | 10 nmΔ | EB lithography |
|  | 11 | — | | W | 90 | $SiO_2$ | 10 | $H_2O_2$ | 10 nmΔ | EB lithography |
|  | 12 | — | | W | 80 | $SiO_2$ | 20 | $H_2O_2$ | 10 nmΔ | EB lithography |
|  | 13 | — | | W | 70 | $SiO_2$ | 30 | $H_2O_2$ | 10 nmΔ | EB lithography |
|  | 14 | — | | W | 60 | $SiO_2$ | 40 | $H_2O_2$ | 10 nmΔ | EB lithography |
|  | 15 | Mo | — | W | 50 | $SiO_2$ | 50 | $H_2O_2$ | 10 nmΔ | EB lithography |
|  | 16 | Mo | 35 | W | 35 | $SiO_2$ | 30 | $H_2O_2$ | 10 nmΔ | EB lithography |
|  | 17 | Mo | 30 | W | 30 | $SiO_2$ | 40 | $H_2O_2$ | 10 nmΔ | EB lithography |
|  | 18 | Mo | 25 | W | 25 | $SiO_2$ | 50 | $H_2O_2$ | 10 nmΔ | EB lithography |
|  | 19 | Mo | 40 | W | 40 | Si | 20 | $H_2O_2$ | 10 nmΔ | EB lithography |
|  | 20 | Mo | 40 | W | 40 | Cr | 20 | $H_2O_2$ | 10 nmΔ | EB lithography |
|  | 21 | Mo | 40 | W | 40 | V | 20 | $H_2O_2$ | 10 nmΔ | EB lithography |
|  | 22 | Mo | 40 | W | 40 | $SiO_2$ | 20 | $H_2O_2$ | 10 nmΔ | EB lithography |
|  | 23 | Al | 100 | — | — | — | — | NaOH | 10 nmΔ | EB lithography |
|  | 24 | Al | 40 | Zn | 40 | $SiO_2$ | 20 | NaOH | 10 nmΔ | EB lithography |

TABLE 6

|  |  | Average surface roughness (nm) | Dissolution rate (nm/sec) | Milling rate (nm/sec) |
|---|---|---|---|---|
| Comparative Examples | 10 | 0.42 | 0.16 | 0.095 |
|  | 11 | 0.5 | 1.03 | 0.105 |
|  | 12 | 0.46 | 1.22 | 0.106 |
|  | 13 | 0.46 | 0.129 | 0.108 |
|  | 14 | 0.45 | <0.03 | 0.122 |
|  | 15 | 0.43 | <0.03 | 0.153 |
|  | 16 | 0.42 | 1 | 0.162 |
|  | 17 | 0.4 | <0.03 | 0.177 |
|  | 18 | 0.41 | <0.03 | 0.181 |
|  | 19 | 0.46 | 0.13 | 0.092 |
|  | 20 | 0.4 | 0.64 | 0.075 |
|  | 21 | 0.36 | 0.58 | 0.09 |
|  | 22 | 0.388 | 0.622 | 0.158 |
|  | 23 | 0.544 | 0.58 | 0.089 |
|  | 24 | 0.48 | <0.03 | 0.92 |

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method for forming a pattern comprising:
    forming a processed layer on a substrate;
    forming an island-like metal underlayer including a first metal on the processed layer;
    forming a phase-separated release layer including at least a first metal, a second metal different from the first metal, and a metal oxide on the processed layer and the island-like metal underlayer;
    forming a mask layer on the phase-separated release layer;
    forming a concave-convex pattern on the mask layer;
    transferring the concave-convex pattern to the mask layer;
    transferring the concave-convex pattern to the phase-separated release layer;
    transferring the concave-convex pattern to the processed layer; and
    dissolving the phase-separated release layer using a peeling liquid for dissolving the first metal and the second metal and removing the mask layer from the processed layer to expose the concave-convex pattern comprised of the processed layer.

2. The method for forming a pattern according to claim 1, wherein the first metal and the second metal are soluble in the peeling liquid and the metal oxide is insoluble in the peeling liquid.

3. The method for forming a pattern according to claim 1, wherein the release layer has a surface roughness of 0.2 nm or less.

4. The method for forming a pattern according to claim 1, wherein the peeling liquid is an acid and the concentration of the peeling liquid in solution is lower than 1 wt %.

5. The method for forming a pattern according to claim 1, wherein the forming a concave-convex pattern on the mask layer comprises forming a resist layer on the mask layer.

6. The method for forming a pattern according to claim 5, further comprising forming a transfer layer between the resist layer and the mask layer.

7. The method for forming a pattern according to claim 1, wherein the forming a concave-convex pattern on the mask layer comprises forming a metal fine particle mask layer on the mask layer.

8. The method for forming a pattern according to claim 1, wherein the forming a concave-convex pattern on the mask layer comprises forming a self-assembled polymer layer on the mask layer, and microphase-separating the self-assembled polymer layer to form a concave-convex pattern in the self-assembled polymer layer.

9. A method for producing a magnetic recording medium comprising:
- forming a magnetic recording layer on a substrate;
- forming an island-like metal underlayer including a first metal on the magnetic recording layer;
- forming a phase-separated release layer including the first metal, a second metal different from the first metal, and a metal oxide on the magnetic recording layer and the island-like metal underlayer;
- forming a mask layer on the release layer;
- forming a concave-convex pattern on the mask layer comprising forming a resist layer on the mask layer;
- transferring the concave-convex pattern of the resist layer to the mask layer;
- transferring the concave-convex pattern to the release layer;
- transferring the concave-convex pattern to the magnetic recording layer; and
- dissolving the release layer using a peeling liquid and removing the mask layer from the top of the magnetic recording layer.

10. The method for producing a magnetic recording medium according to claim 9, wherein the first metal and the second metal are soluble in the peeling liquid and the metal oxide is insoluble in the peeling liquid.

11. The method for producing a magnetic recording medium according to claim 9, wherein the release layer has a surface roughness of 0.2 nm or less.

12. The method for producing a magnetic recording medium according to claim 9, wherein the peeling liquid is an acid and the concentration of the peeling liquid in solution is lower than 1 wt %.

13. The method for producing a magnetic recording medium according to claim 9, further comprising forming a transfer layer between the resist layer and the mask layer.

14. The method for producing a magnetic recording medium according to claim 9, wherein the forming a concave-convex pattern on the mask layer comprises forming a metal fine particle mask layer on the mask layer.

15. The method for producing a magnetic recording medium according to claim 9, wherein the forming a concave-convex pattern on the mask layer comprises forming a self-assembled polymer layer on the mask layer, and microphase-separating the self-assembled polymer layer to form a concave-convex pattern in the self-assembled polymer layer.

* * * * *